United States Patent [19]

DeMonte et al.

[11] Patent Number: 5,525,026

[45] Date of Patent: Jun. 11, 1996

[54] PALLETIZER TRAILER AND STORAGE CONTAINER

[75] Inventors: Walter P. DeMonte; Tim P. DeMonte, both of Windsor, Canada

[73] Assignee: Demonte Fab, Ltd., Ontario, Canada

[21] Appl. No.: 296,810

[22] Filed: Aug. 26, 1994

Related U.S. Application Data

[63] Continuation-in-part of Ser. No. 26,595, Mar. 5, 1993, abandoned.

[51] Int. Cl.$^6$ .................... B60P 1/54; B60P 1/64
[52] U.S. Cl. .................... 414/542; 410/8; 410/24; 410/28.1; 410/89; 414/498; 414/786
[58] Field of Search .................... 414/540–542, 414/498, 786, 561, 234, 239, 240, 679; 410/8–10, 24, 89, 24.1, 26, 28.1; 294/81.53, 81.4, 81.3

[56] References Cited

U.S. PATENT DOCUMENTS

| | | | |
|---|---|---|---|
| 1,739,893 | 12/1929 | Fedderman | 410/8 |
| 1,824,369 | 9/1931 | Reid et al. | 410/24 |
| 1,828,308 | 10/1931 | Been | 414/239 |
| 1,965,525 | 7/1934 | Roscher et al. | 410/25 |
| 2,088,122 | 7/1937 | Taylor | 414/542 |
| 2,204,034 | 6/1940 | Cooper et al. | 410/27 |
| 2,593,717 | 4/1952 | Barrott, Jr. et al. | 414/540 |
| 2,650,731 | 9/1953 | Adler | 414/498 |
| 2,695,568 | 11/1954 | Keith | 410/27 |
| 2,751,095 | 6/1956 | Haverstick et al. | 414/542 |
| 2,832,636 | 4/1958 | Black | 414/540 X |
| 3,095,830 | 7/1963 | Runken | 410/89 |
| 3,175,715 | 3/1965 | Smith et al. | 414/541 X |
| 3,315,825 | 4/1967 | Scheinert | 414/542 |
| 3,482,715 | 12/1969 | Worthington | 414/542 |
| 3,680,491 | 8/1972 | Chapman et al. | 410/89 |
| 3,828,940 | 8/1974 | Cooper | 294/81.4 X |
| 3,980,185 | 9/1976 | Cain | 294/81.53 X |
| 4,106,805 | 8/1978 | Harold | 410/26 |
| 4,245,941 | 1/1981 | Charonnat | 294/81.53 X |
| 4,341,495 | 7/1982 | Del'Acqua | 294/81.53 X |
| 4,759,668 | 7/1988 | Larsen et al. | 410/26 |
| 4,792,268 | 12/1988 | Smith | 410/9 |
| 4,797,049 | 1/1989 | Gearin et al. | 414/498 X |
| 4,963,067 | 10/1990 | Gearin et al. | 414/498 X |
| 5,228,823 | 7/1993 | Crook | 414/498 |
| 5,344,266 | 9/1994 | Kolb | 410/26 |

*Primary Examiner*—David A. Bucci
*Attorney, Agent, or Firm*—Barnes, Kisselle, Raisch, Choate, Whittmore & Hulbert

[57] ABSTRACT

An apparatus and method for storing in a cargo transport of irregular shape, such as vehicles. The cargo transport comprises an elongate hollow highway truck semi-trailer having a pair of longitudinally extending spaced apart upright-side walls defining an interior cargo space therebetween. The trailer has a rearward openable end through which vehicles may be conveyed, and longitudinally extending internal crane runway rails supported by the side walls. A rear portion of the runway is longitudinally extendable rearward of the open rear end of the trailer. A plurality of standardized, stackable vehicle supporting pallets are provided upon which vehicles are individually loaded at a trailer-exterior loading position. A crane travels on the runway longitudinally within the trailer for conveying each loaded pallet longitudinally and vertically from the loading position to a selected forward storage position, and can pivot the pallet as needed about a non-vertical axis from a loading orientation to a storage or transport orientation. The cargo-facing surfaces of the side walls have a fixed excess array of pallet supports arranged in a known pattern coordinated with on-board pallet supports for releasably coupling each pallet to the side walls of the trailer in the storage orientation at the selected storage position. A preprogrammable automatic controller capable of controlling the operation of the crane may be used and preprogrammed using the wall support pattern to select storage positions and orientations of loaded pallets in the cargo space to optimize the use of space within the trailer.

53 Claims, 12 Drawing Sheets

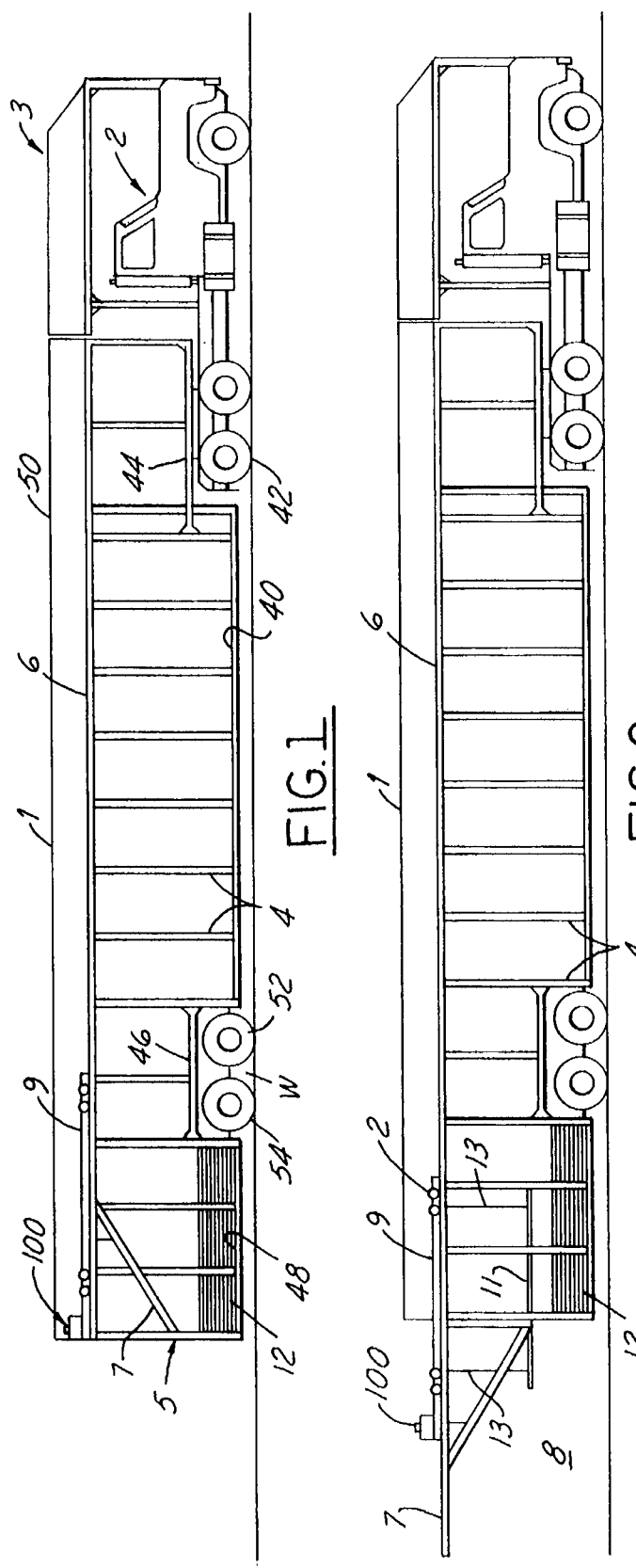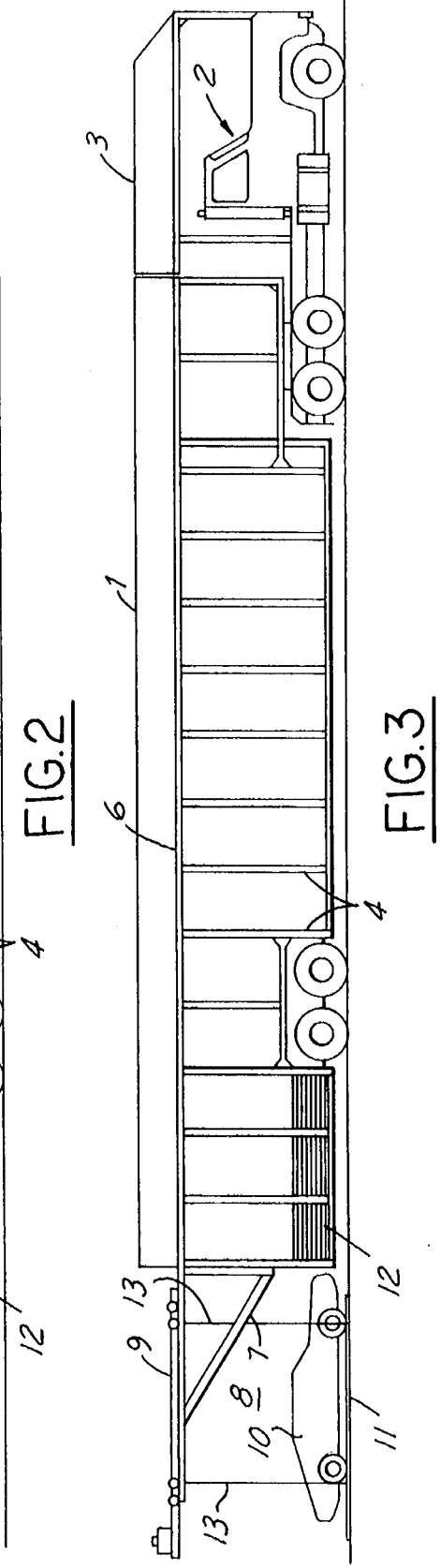

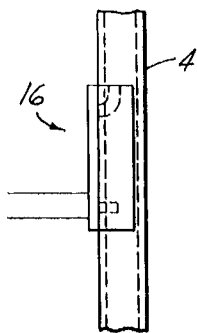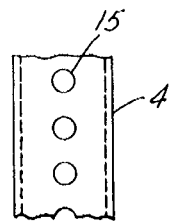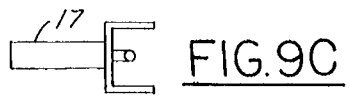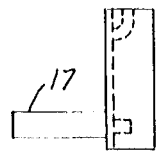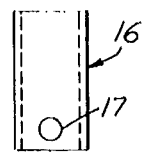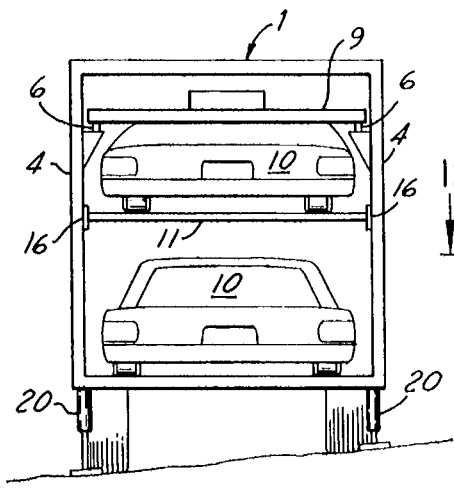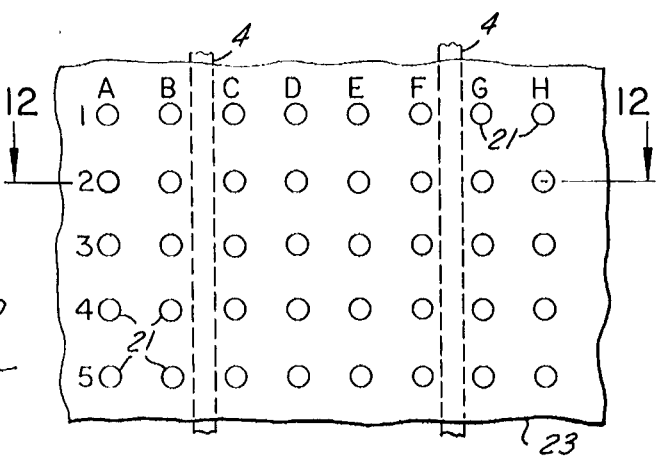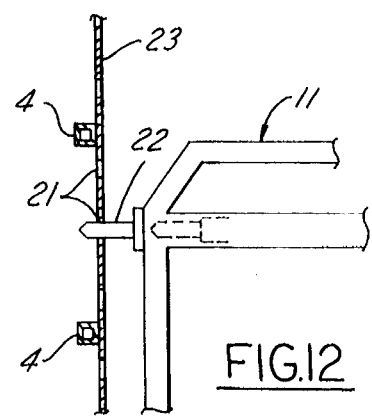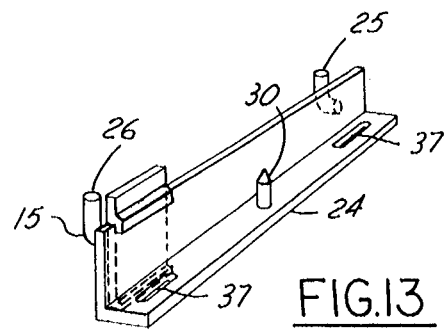

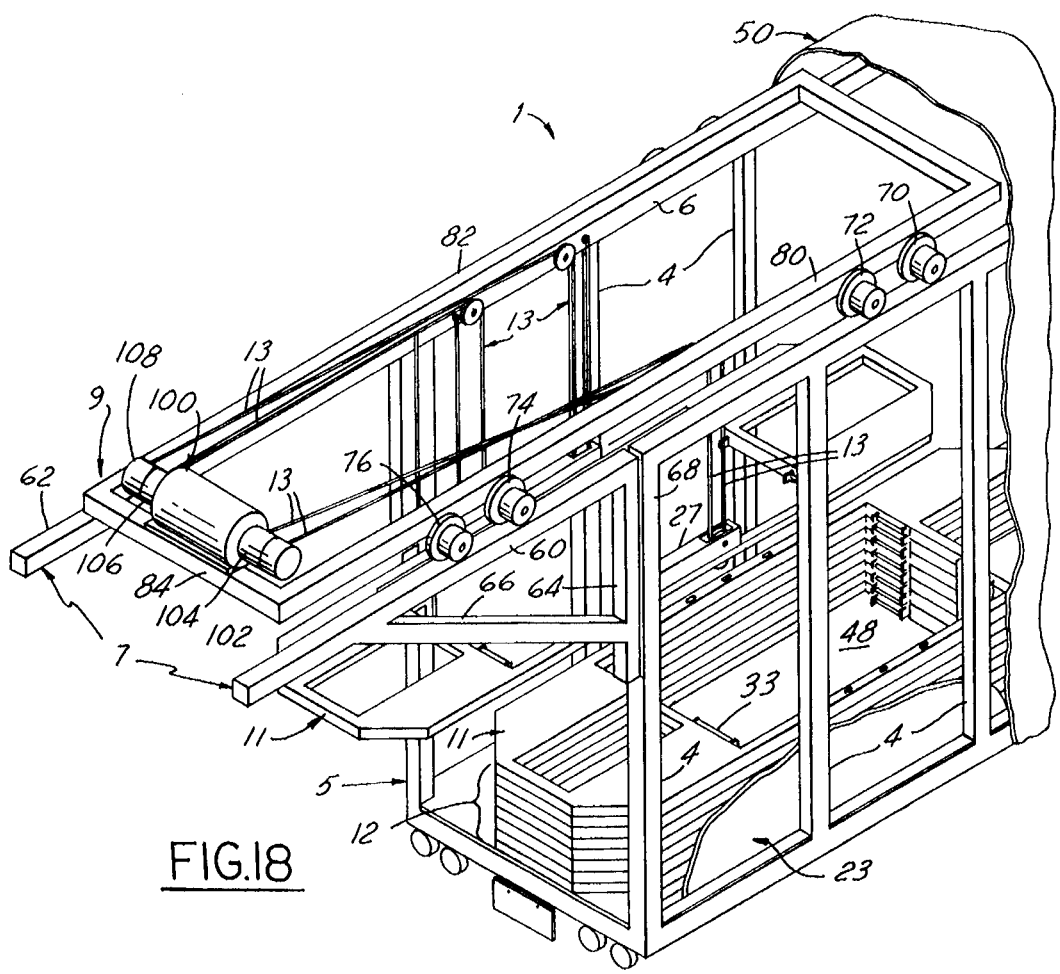
FIG.18
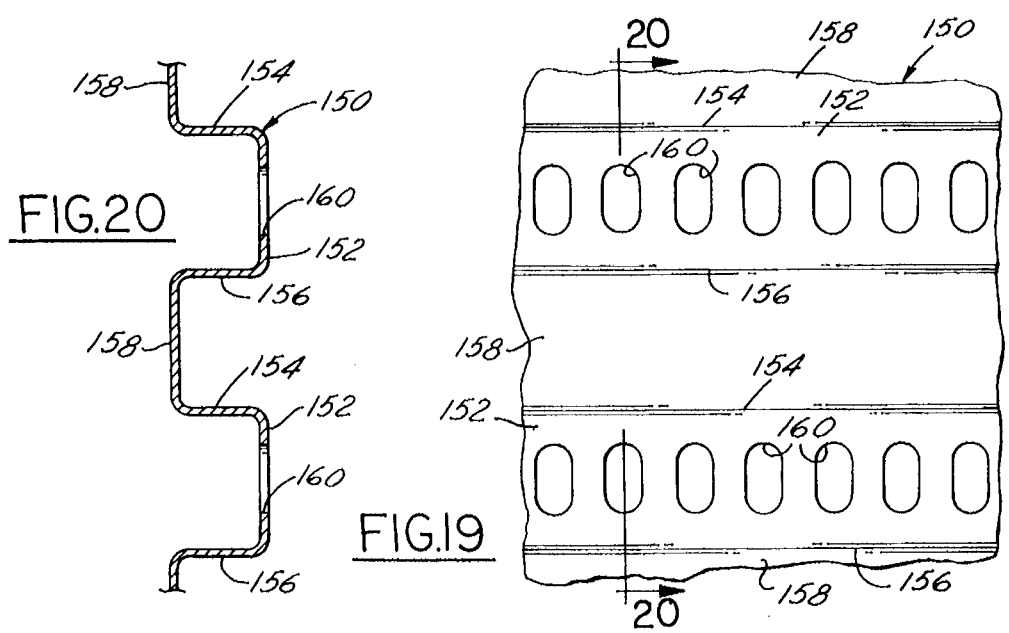
FIG.20
FIG.19

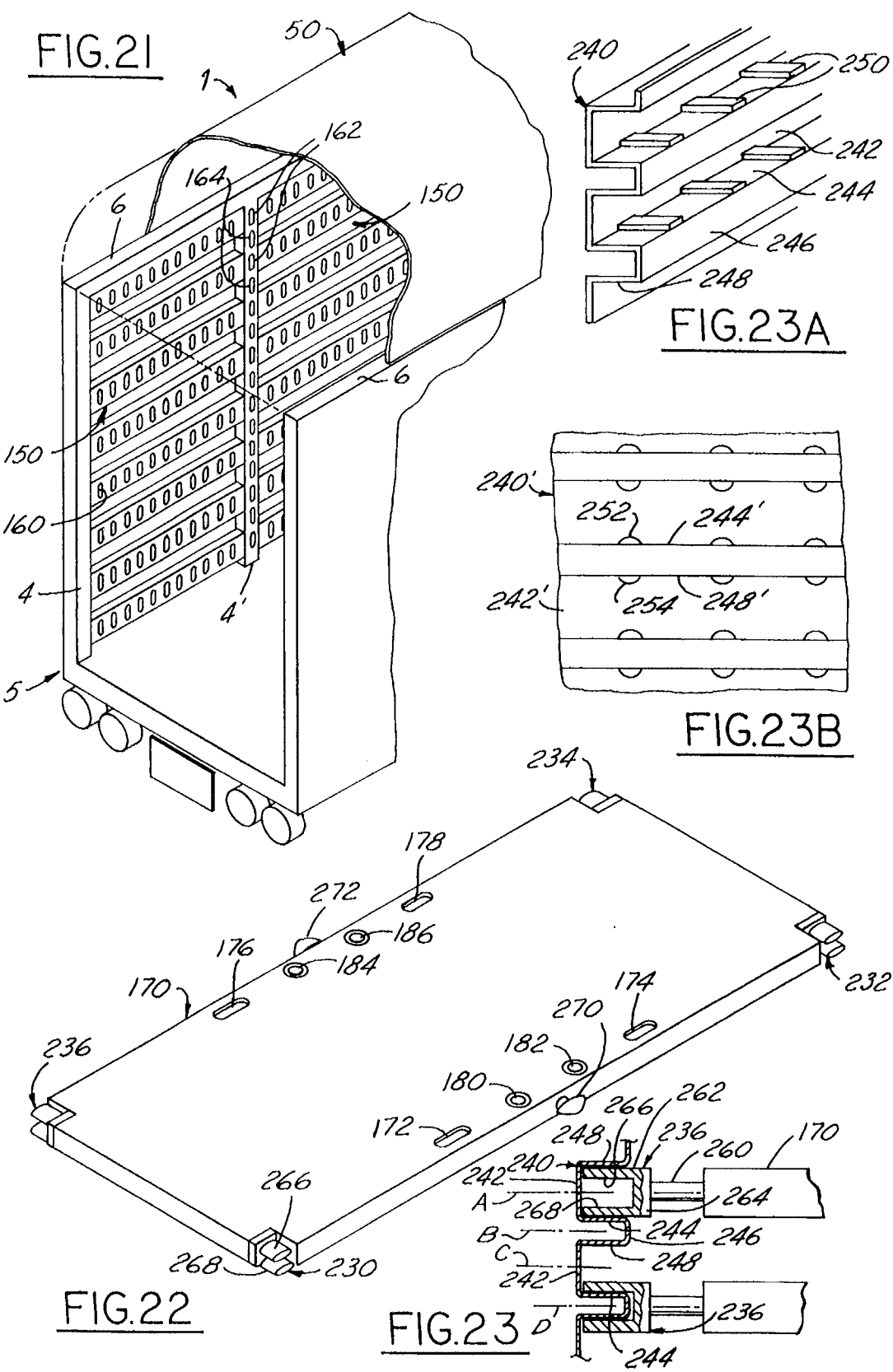

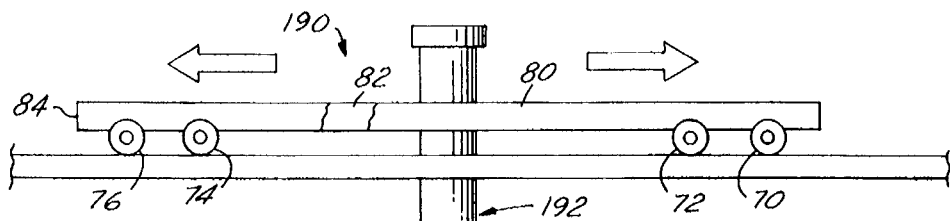
FIG.24
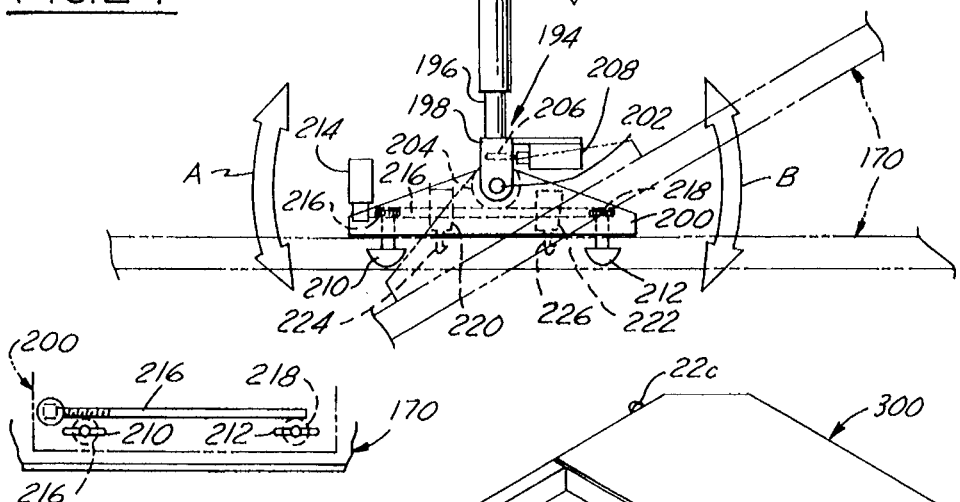
FIG.25
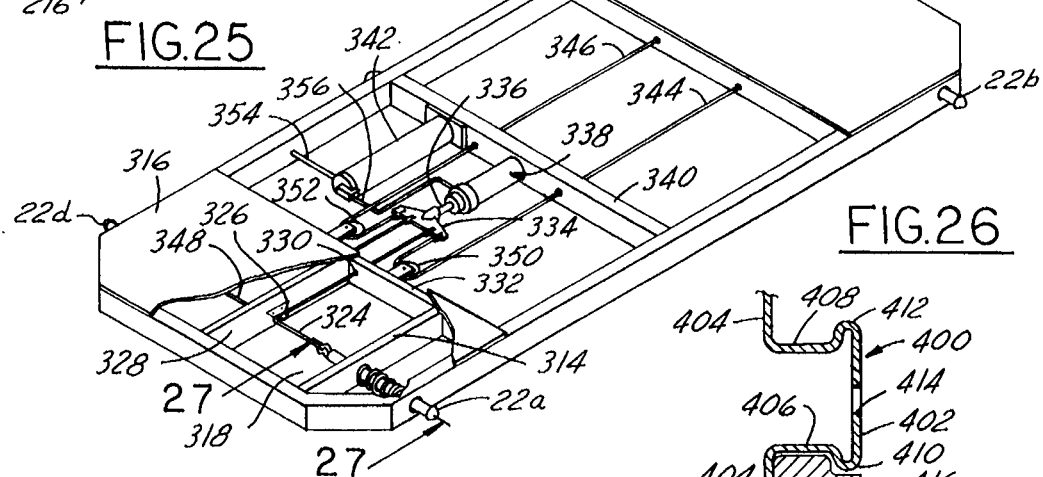
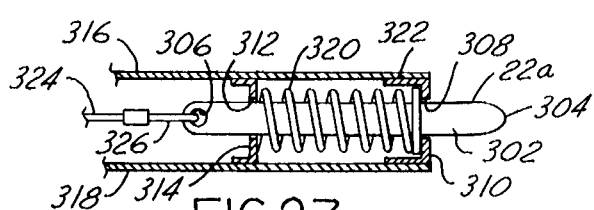
FIG.27
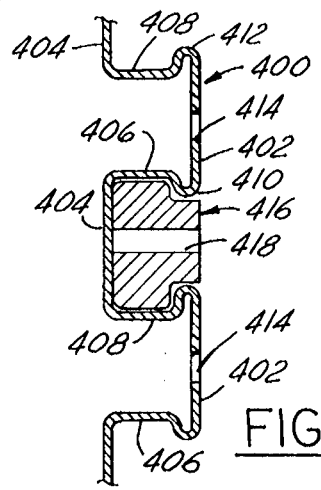
FIG.26
FIG.28

PALLETIZER TRAILER AND STORAGE CONTAINER

FIELD OF THE INVENTION

This application is a continuation-in-part of application Ser. No. 08/026,595 filed Mar. 5, 1993 now abandoned.

This invention relates to a method and apparatus for loading, unloading, storing and/or transporting cargo of irregular shape, such as vehicles nested within a trailer, shipping container or like cargo transport having a self-contained cargo conveyance means, for example an overhead crane for loading and unloading of the cargo transport.

BACKGROUND OF THE INVENTION

Conventionally the land transport of newly manufactured vehicles, such as passenger cars, vans, and small trucks, is carried out using an open framework truck trailer having a series of ramps upon which the vehicles are secured. The height and slope of the ramps are adjusted through the use of hydraulic cylinders in order to load the trailer by driving vehicles over the ramps, and to nest them together when stored on the trailer.

An example of one such conventional trailer is described in U.S. Pat. No. 4,106,805 to Harold issued Aug. 15, 1978. Due to differences in the profiles of vehicles, trailers rapidly become obsolete since in practice a trailer is limited in capacity to a narrow range of vehicles which may be accommodated. A trailer is often limited to hauling the vehicles of one manufacturer only. Even of that single manufacturer's products, to accommodate vans and cars a different trailer configuration must be used.

In loading and unloading the trailers, a high degree of skill is required in properly positioning the ramps, and in driving the vehicles within the very confined space of the trailer's interior. Damage to vehicles is common, resulting in cost increases and delays in delivery. The operator may be injured by falling from the trailer exiting an automobile parked at a raised elevation or climbing on the trailer framework. Injury is also caused by manually lifting the ramps and tying down vehicles in awkward locations.

A distinct disadvantage of such trailers is that after vehicles have been unloaded, the trailer must generally return empty since it is ill suited to transport any cargo other than vehicles.

A significant disadvantage to conventional truck trailers is the exposure of loaded vehicles to vandalism or accidental damage from rocks and debris thrown from the road surface by moving traffic. Conventional trailers cannot be clad with a protective outer sheeting or screen since the operator would be prevented from entering and exiting the loaded vehicle by such sheeting.

In transporting vehicles by rail, vehicles must also be driven on and off rail cars within confined spaces, and the vehicles are secured on horizontal fixed platforms which do not allow for nesting of the vehicles. As a result, there is a large portion of unused space within rail cars. U.S. Pat. Nos. 1,965,525 to Roscher et al, Jul. 3, 1934, and 2,204,034 to Cooper et al, Jun. 11, 1940, propose nesting of vehicles in rail cars by means of pivotable sloping ramps. However, neither design appears to be currently in commercial use.

The advantages inherent in use of intermodal cargo containers, such as reduced handling costs, pilferage, damage and overall transmit time, have been incorporated into a vehicular transport container proposed in U.S. Pat. No. 4,759,668 to Larsen et al issued Jul. 26, 1988, and in U.S. Pat. Nos. 4,797,049 and 4,963,067 respectively issued Jan. 10, 1989 and Oct. 16, 1990 to Gearin et al.

The use of containers to ship vehicles would significantly improve the timing, security and costs of shipping compared to current methods which require frequent repositioning of vehicles between rail, sea, and land transport modes. Inserting vehicles into containers at the manufacturing plant and shipping to a dealer continuously supported on and/or contained in a prospective shipping pallet or container would reduce costs as proven in respect of other cargo, and would eliminate much of the damage to and soiling of new vehicles presently experienced. To date however no such method has found commercial acceptance.

The development of conventional trailers has reached a complexity where all vehicle supporting ramps move up and down, and may extend and retract, through a limited range and require the provision of complex and costly system of permanently trailer-mounted hydraulic rams for each ramp. In practical terms the cost, complexity of fabrication, difficulty of maintenance and operation have done nothing to address the basic limitations of such trailers.

Conventional auto-transport highway semi-trailers also retain the costly limitation of being unsuitable for transporting any cargo but vehicles. Adaptability to transport different vehicle types and sizes remains limited.

OBJECTS AND SUMMARY OF FEATURES OF THE INVENTION

An object of the present invention is to overcome the disadvantages of the prior art in a novel manner by the provision of an apparatus for storing and transporting vehicles comprising an elongate hollow cargo transport container with a self-contained "on-board" cargo conveyance, such as an overhead crane running longitudinally therein, capable of conveying a vehicle, while secured on a pallet, longitudinally and vertically and of pivoting the vehicle, and cooperable with a plurality of pallet connectors for coupling the vehicle-laden pallets to walls of the container in a variety of selected storage orientations.

In a preferred aspect the invention provides an apparatus for transporting vehicles comprising an elongate hollow truck trailer having longitudinally spaced-apart vehicle-pallet-supporting interior side walls, a rearward open end through which vehicles may be conveyed, and longitudinally extending internal crane overhead runway rails supported by the side walls. The crane runway includes a rear portion longitudinally extendable rearward of the open end of the trailer. A plurality of standardized vehicle supporting pallets are provided upon which vehicles are individually loaded at a loading position. A crane of the overhead gantry or travel hoist type runs on the rails longitudinally within the trailer. The crane is capable of conveying a loaded pallet longitudinally and vertically from the loading position to a selected forward storage position, and pivoting the pallet about a non-vertical axis from a loading orientation to a storage orientation. The crane includes a preprogrammable automatic controller capable of controlling the operation of the crane, and of selecting storage positions and orientations to optimize the use of space within the trailer.

In one embodiment a plurality of removable brackets releasably couples the pallet to the walls of the trailer in the storage orientation at the selected storage position. Preferably, however, the pallet-supporting transport interior side wall structure is fixed and static and provided in a predetermined overall uniform pattern array, and the movable wall couplers are provided only on board each pallet.

Another object of the invention is to provide an improved highway vehicle transport semi-trailer that may be used to transport any type of cargo and is not limited to vehicles exclusively as are conventional trailers. Advantageously any irregularly shaded cargo may be housed in the trailer in a nested array upon pallets in the same manner as are irregularly shaped vehicles. Alternatively, the pallets may be stored flat on the floor of the trailer and the remaining internal space may be used in a manner identical to conventional enclosed van trailers.

A further object is to provide an improved vehicle transporting system wherein the container within which vehicle cargo is stored may be: a stationary warehouse or parking garage; an intermodular shipping container; or a hollow truck trailer. In a stationary application banks of parallel containers or aisles with transverse transfer bays may be used advantageously.

Still another object of the invention is to provide an improved vehicle highway transport system offering enhanced flexibility in positioning a wide variety of vehicle sizes and profiles, in any chosen combination, enabling an optimization of space usage and flexibility unknown in conventional methods. The ability to combine a wider variety of vehicle types and to carry other types of cargo enables better route and load planning over conventional methods.

By utilizing integral or self-contained cargo conveyance means on the cargo transport, preferably having preprogrammable controls and optimization capability, the skill required of the operator is significantly reduced. The operator is no longer required to drive the vehicles within the container, nor to operate potentially dangerous and damaging movable ramps.

The operator remains at ground level during most stages of the operation and therefore is not exposed to the risk of injury from falling that is associated with conventional trailers. In using conventional trailers, injury may result from the necessity to manually lift ramps and to tie down vehicles that are in awkward positions and locations.

A trailer according to the invention preferably always includes external cladding to protect vehicles from accidental damage and vandalism. Due to the need to access the doors of vehicles and moving parts, it is impractical to enclose conventional trailers in cladding.

Yet another object is to provide an improved trailer of the aforementioned character in accordance with the invention which may be used for transporting cargo other than vehicles. By storing the standardized pallets in a compact pile, the enclosed trailer interior is clear and may be used as a conventional box trailer. This feature is a distinct advantage since conventional vehicle trailers can only be practically used for transporting vehicles. As a result more efficient use of tractors, trailers and fuel is possible since trailers are not required to return empty but may carry non-vehicle cargo.

Further object, features, advantages and other aspects of the invention will become apparent upon review of the following detailed description, appended claims and accompanying drawings. It will be understood from the description, claims and drawings that, although the preferred embodiment relates to use in transporting vehicles, the invention may be applied to the transport of any type of cargo, or to storing vehicles or cargo within a stationary automated parking garage or automated warehouse.

BRIEF DESCRIPTION OF THE DRAWINGS

In order that the invention may be readily understood, preferred embodiments of the invention will be described by way of example with reference to the accompanying drawings in which:

FIG. 1 is a simplified, semi-schematic elevational view of an unloaded truck trailer without external cladding and having an onboard overhead crane and in its rearward portion a stack of standardized pallets thereunder;

FIG. 2 is a like elevational view showing the rearward extension of the crane runway supporting the crane, and an empty pallet suspended therefrom extending partly rearward of the open rear end of the trailer;

FIG. 3 is a like elevational view showing the crane over the exterior loading position and a vehicle loaded upon the pallet resting upon the ground rearward of the trailer;

FIG. 7 is a detailed fragmentary elevation view of a removable bracket engaging a post for releasably coupling a pallet to the post (or to the perforated wall of FIGS. 11 and 12), with a pallet-supporting rod extending inward into the interior of the trailer;

FIG. 8 is a detailed fragmentary inward elevation view of the post of FIG. 7 with the bracket removed;

FIGS. 9A, 9B and 9C respectively show front elevation, side elevation and top plan views of the bracket of FIG. 7;

FIG. 10 is an end elevation view along line 10—10 of FIG. 6;

FIG. 11 is a fragmentary elevation view of a section of another and preferred embodiment of interior trailer wall having a pattern of perforations to support pallets;

FIG. 12 is a fragmentary sectional and plan view taken on the line 12—12 of FIG. 11 showing a second alternative pallet supporting system with telescoping pallet-carried pins extending from a pallet to engage a perforated wall of FIG. 11;

FIG. 13 is a perspective view of a further third alternative pallet supporting bracket which engages two posts or the perforated wall of FIGS. 11 and 12;

FIG. 18 is a fragmentary perspective view further illustrating the rear portion of the truck trailer 1 of FIGS. 1–6 with the on-board crane mechanism supported in part on the crane runway extensions in their rearwardly extended exterior loading and unloading position, with various portions broken away and portions omitted to better illustrate detail;

FIG. 19 is a fragmentary elevational view of another embodiment of interior cargo carrying wall structure;

FIG. 20 is a cross-sectional view taken on the line 20—20 of FIG. 19;

FIG. 21 is a fragmentary semi-schematic perspective view of the rear portion of truck trailer 1 of the invention equipped with the interior wall structure embodiment of FIGS. 19 and 20;

FIG. 22 is a simplified semi-schematic perspective view of another embodiment of a vehicle-carrying pallet of the invention for use in tractor trailer 1 when equipped with a modified interior pallet-carrying wall structure of the embodiments of FIGS. 23, 23A or 23B;

FIG. 23 is a fragmentary view taken in vertical section through a modified interior wall structure and illustrating alternate coupling positions of the movable couplers provided on the pallet of FIG. 22;

FIG. 23A is a fragmentary perspective view of a modified wall structure usable with the pallet-carried wall couplers of FIGS. 22 and 23;

FIG. 23B is a fragmentary elevational view of a further modified wall structure usable with the couplers of FIGS. 22 and 23;

FIG. 24 is a simplified, semi-schematic elevational view of a modified crane hoist equipped with a pallet handling and power driving hoisting attachment;

FIG. 25 is a fragmentary top plan semi-schematic view of a portion of the pallet hoist power operating mechanism of FIG. 24;

FIG. 26 is a fragmentary simplified perspective view, with portions broken away, illustrating a further modified form of vehicle supporting pallet incorporating an "on-board" wall coupler operating mechanism also in accordance with the present invention;

FIG. 27 is a fragmentary part-sectional view taken on the line 27—27 of FIG. 26;

FIG. 28 is a fragmentary cross-sectional view taken on the line 28—28 of FIG. 29;

DETAILED DESCRIPTION OF PREFERRED EMBODIMENTS OF THE INVENTION

Figure 16:
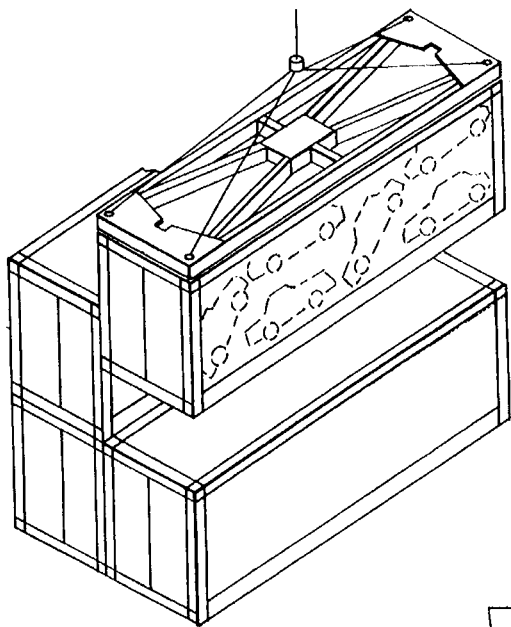
FIG. 16 shows a second transport embodiment of the invention applied to an intermodal cargo shipping container.
Figure 17:
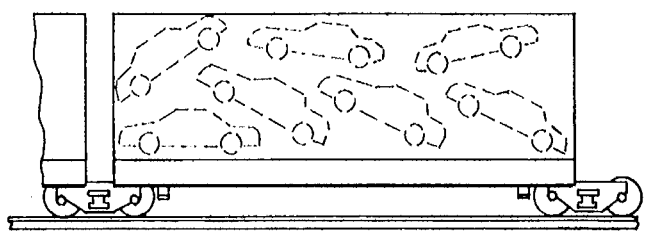
FIG. 17 shows a third transport embodiment of the invention applied to a railway car.

The sequence of FIGS. 1 to 6 illustrate an example of a highway transport tractor truck and semi-trailer and its method of loading with road vehicles. It will be understood that the invention is also applicable to intermodal cargo containers (as shown in FIG. 16), and railway cars (as shown in FIG. 17) in an analogous fashion.

The self-contained hoist means to convey the vehicles within the container is illustrated as an overhead gantry-type crane 9 with cables 13 to support a pallet 11. It will be understood that other types of cargo-conveyance hoist means may be provided, such as an overhead monorail and trolley or hydraulic lifting means as discussed in more detail hereinafter. The pallets may be replaced with other suitable means to support the vehicle within the teachings of this invention, such as wheel saddles attached to and adjustable within an open standardized pallet frame which in turn is removably attached to the interior walls of the container. Also, for certain types of cargo packaged in standardized containers of predetermined dimensions, the container itself may be used as a "pallet" by attaching movable wall couplers thereto at given locations on the container so as to be cooperable with the interior cargo supporting trailer side walls provided in accordance with the invention.

Figure 5:
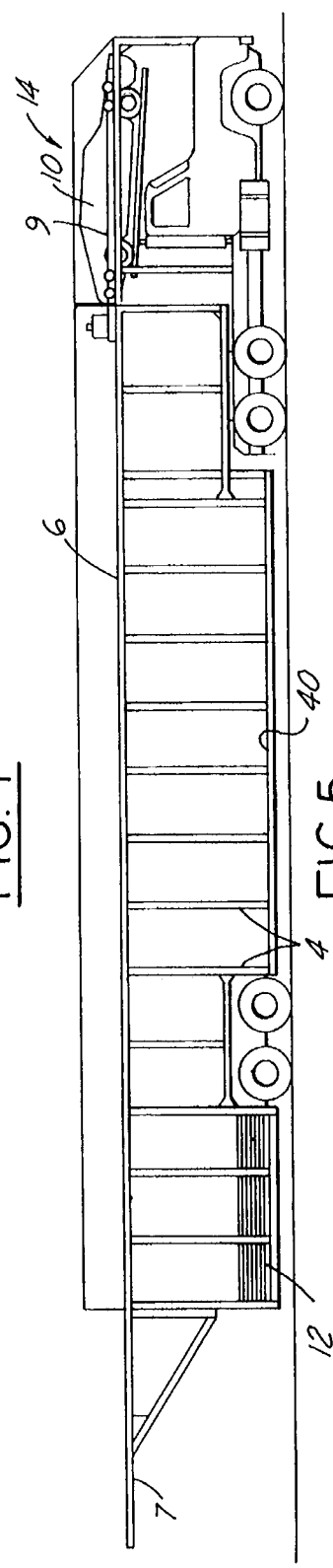
FIG. 5 is a like elevational view showing the vehicle and associated pallet in the storage or transport position and orientation after being conveyed longitudinally, pivoted, and raised within the trailer by the crane.
Figure 6:
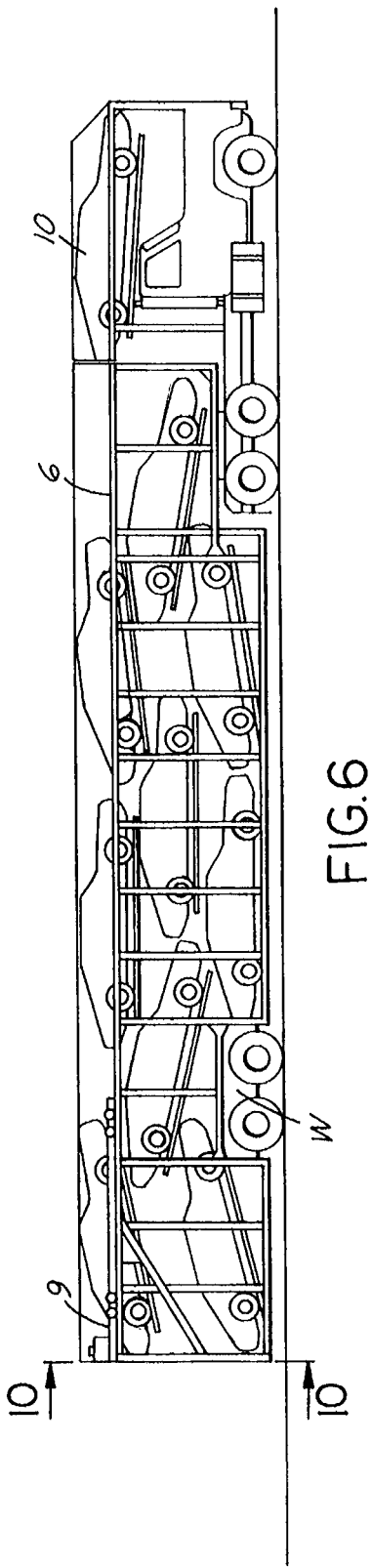
FIG. 6 is a like elevational view schematically showing the trailer filled with compact-size vehicles nested in a variety of storage or transport positions and orientations.

A truck trailer 1 is conventionally engaged upon a fifth wheel of a truck tractor 2. The truck tractor 2 has an overcab portion 3 in order to accommodate a vehicle 10 as illustrated in FIGS. 5 and 6. The trailer 1 in operation may pivot relative to the truck tractor 2 and attached overcab portion 3. However, during loading and unloading, trailer 1 and overcab portion 3 are longitudinally aligned.

The trailer 1 as illustrated in FIG. 1 is an elongate hollow transportable container and has longitudinally spaced side wall support means in the form of supporting posts 4. The rearward end of the trailer 1 is open and vehicles may be conveyed through this open end 5. Internal rail means, illustrated in the form of longitudinally extending crane runway rails 6, include a rear rail portion 7 which may be longitudinally extendable rearward of the open end 5 of the trailer 1 as shown in FIGS. 1 and 2. The rear portion 7 of the crane runway 6 is vertically hinged, such that both rear rail sections of rear portion 7, one associated with each of the pair of parallel rails 6, are individually hinged about a vertical axis to extend over the loading area 8.

Cargo-conveyance means in the form of an overhead crane 9 run on the rails 6 longitudinally within the trailer 1. The overhead crane 9 is capable of conveying a vehicle loaded thereon longitudinally and vertically from a loading position (as shown in FIG. 3) to a selected forward transport position (as shown in FIG. 5).

The crane 9 preferably has double wheeled end trucks as illustrated which enables the crane 9 to smoothly travel over the gap between the trailer 1 and overcab portion 3.

The overhead crane 9 is also capable of pivoting the vehicle 10 about a non-vertical axis from a loading orientation (as shown in FIG. 3) to a transport orientation (as best shown in FIG. 6).

Commencing the loading operation, the truck 2 and trailer 1 are positioned such that the overcab portion 3 and trailer 1 are longitudinally aligned. It will be understood that a trailer 1 as described, may be used without the overcab portion 3 although to lesser advantage.

As shown in FIG. 10, the trailer 1 is leveled by extending telescoping adjustable legs 20, then releasing air from the trailer air cushion suspension to rest the trailer 1 upon the legs 20.

The hinged sections of rear portion 7 of the crane runway rails 6 are extended longitudinally rearward of the open end 5 of the trailer 1, by rotating each section of the rear portion 7 about a vertically aligned hinge, and locking the rear portion 7 in position above the exterior loading area 8 as shown in FIG. 2. A single pallet 11 is lifted by the overhead crane 9, by means of suspending hoisting cables 13, from a stack of pallets 12 positioned in the rearward portion of the trailer 1.

Figure 4:
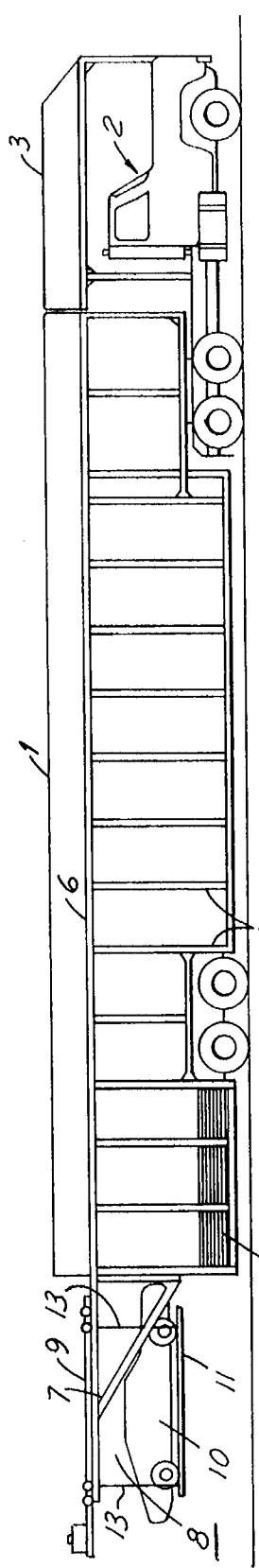
FIG. 4 is a like elevational view showing the loaded pallet and vehicle lifted by the crane over the exterior loading position.

The crane 9 is moved rearwardly and halted over the exterior loading area 8. Crane cable hoists are activated to lower the pallet 11 to ground level in the loading area 8. The vehicle 10 is driven upon the pallet 11 and secured thereto (FIG. 3). As shown in FIG. 4 the cable hoists are then activated to lift the loaded pallet 11 from the loading position. The operator ties down the vehicle 10 to the pallet, with chains for example, either while in the ground level position of FIG. 3 or while the vehicle 10 is suspended at a conveniently accessible height as in FIG. 4.

The pallet 11, with vehicle 10 loaded upon it, is suspended from the overhead crane 9 by four cables 13, one cable 13 approximately at each corner of the pallet 11. In order to Divot the vehicle 10 from its loading orientation (as illustrated horizontal) to a selected transport orientation (as shown in FIG. 6), the forward pair of cables 13 is operable independently of the rearward pair of cables 13. In a preferred embodiment each of the four suspending cables 13 is independently operable in order to pivot the vehicle about any two non-vertical orthogonal axes. Therefore, the vehicle may be pivoted about a transverse horizontal axis as shown in FIG. 6, or about an axis parallel to the longitudinal axis of the trailer 1, or any combination of the two pivoting motions. In this manner the vehicle 10 may be nested in a compact array, within the interior of the trailer 1 in longitudinal or transverse section. For example, if the width of the vehicles is much less than the width of the interior of the trailer 1, it is possible to nest the vehicles in a transverse section of the trailer 1 in addition to the nesting of vehicles in a longitudinal section as shown in FIG. 6. However, the two-axis mobility of the load-carrying pallets finds greater application on the return trip when loading and unloading general cargo containers of widely varying size and configuration. As will be set forth in more detail hereinafter, in the preferred vehicle loading, transporting and unloading system of the invention, the pallets are moved about using a single pivot axis system (i.e., pivoted about an axis perpendicular to the trailer interior side walls) while keeping them stable or non-pivoting on the second axis (i.e., an axis parallel to the two side walls of the trailer).

As illustrated in FIG. 6, the vehicles may be arranged to nest around the trailer rear wheel wells W. The full maximum height of cargo space is thus utilized. In conventional pallet systems as described in U.S. Pat. No. 4,759,668 to Larsen et al, vehicles cannot be oriented to nest around the wheel wells, thereby reducing the effective volume of cargo space available.

Referring to FIGS. 4 and 5, the crane 9 runs longitudinally on the rails 6 to convey the first palletized vehicle 10 forwardly from a loading position to a selected forward storage or transport position 14. In the embodiment shown in FIGS. 7–10, connectors are provided at the storage position to releasably operably couple the vehicle 10 to the posts 4 of the trailer 1, in the storage orientation at the selected storage position 14, as illustrated in FIGS. 5 and 6.

Referring to FIGS. 7, 8 and 9, the posts 4 in the embodiment illustrated have a vertical series of holes 15 within which the removable bracket 16 is engaged as shown in FIG. 7. An inwardly projecting rod 17 is used to support the pallet 11, and vehicle 10 loaded on the pallet. The pallet 11 may be secured to the rod 17, and the vehicle 10 to the pallet 11 by any suitable means.

It will be understood that unloading of vehicles from the trailer is conducted in a manner reverse to that described above. The steps described above are repeated for successive vehicles 10, to nest a plurality of vehicles 10 in a selected series of progressively rearward longitudinal transport positions 14 and associated transport orientations. As shown in FIG. 6 therefore, the invention enables substantial filling of the interior of the trailer 1 in a manner which provides significantly greater flexibility in arranging loads than conventional methods.

Since the pallets may be positioned anywhere within the interior of the trailer, and in any selected orientation, any size or shape of vehicle 10 can be easily accommodated. As well, a load may contain a variety of different vehicles or other types of cargo which are easily accommodated by merely selecting the appropriate locations for the brackets 16, or alternatively and preferably, by utilizing the pattern of perforations 21 of the perforated wall plate 23 which are selectively engaged by pallet pins 22 of the embodiment of FIGS. 11 and 12 described hereinafter.

However, it will also be understood that a large quantity of brackets 16 may be hung on wall plate 23 by hooking and bracket 16 into a selected perforation 21 at predetermined locations each interior facing surfaces of the laterally opposed wall plates 23. Thus, with a plural vehicle load silhouette pattern determined in advance, the X and Y wall coordinates can be programmed for all of the vehicle-loaded pallet storage positions. A suitable number of brackets 16 may then be hooked individually into those perforations 21 of each side wall 23 as so identified to thereby provide only enough bracket supports 16 for those pallets needed for this particular vehicle load silhouette storage array.

Alternatively, to provide a universal wall support system using brackets 16 and associated perforated wall plates 23, a large excess of brackets 16 can be mounted one into each perforation 21 on each side wall 23, thereby utilizing most if not all of perforations 21 in each wall 23, to provide a uniform pattern of brackets 16 along X and Y coordinates of each wall 23. For such a system, bracket installation on the cargo carrying trailer side walls need only be performed once to accommodate a variety of load silhouette patterns, since each particular load pattern can be programmed for support on such a uniformly arranged wall-hung-bracket support system.

It thus will be seen that, in either instance of use of brackets 16 and wall 23 both the aforementioned wall-support engaging structure suitably provided on each pallet 11 (for releasably engaging associated selected brackets 16) and the wall-hooked brackets 16 (as well as wall 23) may be provided for use in the system each as static structures having no moving parts in and of themselves.

Preferably the crane 9 is operated and programmed automatically, such that the operator is only required to position the removable brackets 16 in the automatically selected positions, and to secure the vehicles 10 to the crane 9. Conventional preprogrammable automatic hoist controls, indicated as 100 in FIG. 1 on the crane 9,thereafter control all operations of the crane to deposit the vehicle in its selected transport position and transport orientation. Unloading of the trailer 1 may be carried out using preprogrammable automatic controls in a like manner. Controls may also be provided which are capable of selecting transport positions and orientations to optimize the use of space within the trailer 1. For example, three dimensional graphic computer programs which are commonly used for various manufacturing procedures can be adapted for this function.

In the embodiment illustrated in the drawings, the pallets 11 individually support the wheels of an associated vehicle 10 loaded on the pallet 11. Alternatively, a pallet 11 or other support means (not illustrated) may support the undercarriage frame of the vehicle 10 loaded upon such a modified pallet 12.

The embodiment of the invention illustrated shows the application of the invention to a truck trailer 1, however, it will be apparent that the invention may also be applied to other elongate hollow transportable containers, such as rail cars (as shown in FIG. 17) and intermodal cargo containers (as shown in FIG. 16). As well, it will be appreciated that although the method illustrated shows the trailer loading position for all vehicles at a fixed horizontal elevation, an overhead crane may be used where the loading position of the trailer is raised or sloped with equal advantage.

A second alternative and presently preferred method of supporting pallets 11 is shown in FIGS. 11 and 12. The interior trailer wall may be designed as a continuous plate 23, with a pattern of perforations 21 to receive pallet supporting pins. The pallet 11 has mechanically or hydraulically actuated telescoping pins 22 which are extended from four corners of the pallet 11 to engage the perforations 21 of the interior trailer wall, as will be explained in more detail hereinafter in conjunction with the embodiments of FIGS. 18-51.

Figure 14:
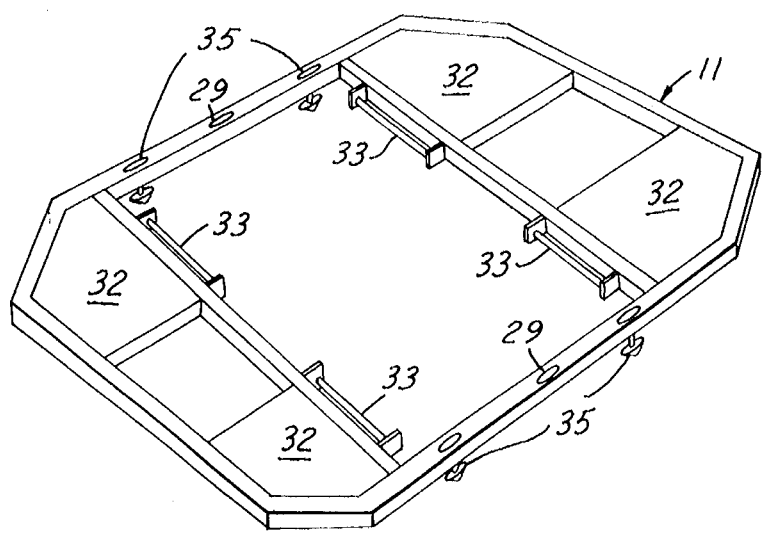
FIG. 14 is a semi-schematic upper perspective view of a pallet according to the third alternative.
Figure 15:
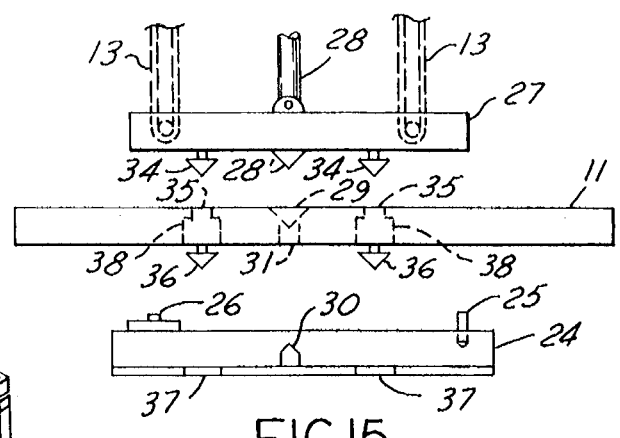
FIG. 15 shows an elevation view of the interaction between (from top to bottom) a crane lifting beam, a pallet of FIG. 14, and a bracket of FIG. 13.

A third alternative embodiment is illustrated in FIGS. 13, 14 and 15. As illustrated in FIG. 13 an elongate bracket 24 has two L-shaped pins 25 and 26 which connect to holes 15 in two adjacent posts 4 of the interior trailer wall, or to two selected perforations 21 in wall 23. Since the bracket 24 may be positioned at a variety of angles to the horizontal, the distance between post holes 15 engaged by the pins 25 and 26 may vary. Therefore, the combination of a fixed pin 25 and an adjustable Din 26, which slides along the length of the bracket 24, allows for differences in the distance between holes 15 when the bracket 24 is placed at an angle to the horizontal. It will be seen that this adjustment structure may be eliminated in the case of wall 23.

FIG. 15 shows the interconnection of a crane lifting beam 27, a pallet 11, and the bracket 24. The lifting beam 27 is suspended from the crane 9 (not shown) on cables 13. Preferably the crane 9 also includes a telescoping guide bar 28 which extends from the crane 9 to the beam 27 in order to dampen any swaying of the suspended load. A first alignment pin 28' engages a first alignment socket 29 in the pallet 11. The bracket 24 has a second alignment pin 30 which engages a second alignment socket 31 in the pallet 11.

As described above and with reference to FIG. 14, a vehicle 10 (not shown) may be driven upon the pallet 11 with wheels supported upon wheel pads 32 of the pallet 11. The vehicle is then secured to the pallet 11 for example by means of chains between the vehicle's undercarriage and tie down bars 33.

The lifting beam 27 is engaged with the pallet 11 by aligning the first alignment pins 28' and sockets 29. First locking pins 34 having an arrow-head shape are inserted into mating first locking slots 35. The locking pins 34 are mechanically rotated (e.g., 90°) to securely engage the lifting beam 27 and pallet 11.

The pallet 11 and loaded vehicle are then transported to the transport position where the bracket 24 has previously been secured to the trailer wall. The pallet 11 is lowered to engage the second alignment pin 30 and second alignment socket 31.

By further rotating the first alignment pins 34 to a release position, pallet 11 is secured to the bracket 24 by also rotating (e.g., 90°) second alignment pins 36 inserted through mating slots 37.

Within the pallet 11, at each slot 35, a block 38 is rotatably housed. The upper end of the block 38 engages the first alignment pin 34, and the second alignment pin 36 extends from the bottom of the block 38. When the first alignment pins 34 are rotated to release the pallet 11, the blocks 38 also rotate to lock the second alignment pins 36 in mating slots 37. When the pallet 11 is unloaded, the above process is reversed.

Although this disclosure has thus far described and illustrated certain preferred embodiments of the invention, it is to be understood that the invention is not restricted to these particular embodiments. Rather, the invention includes all embodiments which are functional or mechanical equivalents of the specific embodiments and features described and illustrated both hereinbefore and hereinafter.

Thus, from the foregoing description and drawings, it will now be understood by those of ordinary skill in the art that the present invention, in one important aspect, provides an improved method and apparatus for storing and transporting vehicles and general cargo. A presently preferred embodiment of this apparatus constitutes the elongate hollow, highway semi-trailer type of road vehicle 1 illustrated semi-schematically in FIGS. 1–6. Typically the exterior dimensions of the trailer are made to the maximum permissible size as allowed by highway and city overhead clearance, length and width restrictions, e.g., the standard 13' 6" maximum elevation or height limit of the trailer above the road bed. As will be evident from FIGS. 1–6, in order to maximize interior cargo carrying space the main horizontal floor 40 of the trailer is made as low as possible consistent with road clearance requirements. Main floor 40 thus extends rearwardly from the rear wheels 42 of tractor 2 substantially below the elevation of the load supporting "porch" floor 44 disposed over the conventional fifth wheel coupling of tractor 2. It will be also seen from FIGS. 1–6 that the interior load supporting floor of trailer 1 also has a raised section at 46 which extends over and between the wheel wells W of the trailer and above the wheel axles (not shown) associated with the tandem rear wheels 52 and 54 of trailer 1. A rear floor section 48 extends rearwardly from wheel wells W to the openable rear end 5 of the trailer and at the same elevation as the main floor 40 of the trailer. The rear floor section 48 thus provides room for the storage of the stack 12 of standardized pallets 11, and when the pallets are in use provides additional cargo carrying capacity for a vehicle or a general cargo as shown in FIG. 6.

As will be seen from one form of the preferred embodiment as shown in FIGS. 11 and 12, the invention is further characterized by the road trailer having a pair of longitudinally extending and laterally spaced apart upright perforated pallet-support interior side walls 23, supported for example by upright posts 4, which define an interior cargo-carrying space of the trailer. Trailer 1 also has a rearward openable end 5 through which palletized vehicles 10 may be individually conveyed for loading the same into the trailer or unloading the same from the trailer to and from a predetermined optimized side silhouette loading pattern (e.g., FIG. 6). Trailer 1 also has a longitudinally extending, self-contained internal crane runway which includes the pair of rails 6 supported along the upper edge of each of the upright side walls. This crane runway also includes the rear rail portion 7 which is longitudinally extendable rearward of the open end 5 of the trailer over a pallet loading and unloading position 8 disposed exteriorly of the trailer. A plurality of vehicle supporting pallets 11 of standardized size are provided for use with trailer 1 upon which vehicles 10 are individually loadable and securable at the exterior loading position 8. The overhead crane 9 is also provided as an integral part of the trailer and runs on runway rails 6 longitudinally within the trailer beneath the exterior weather shroud roof 50 of trailer 1.

Crane 9 is capable of conveying pallets 11 individually longitudinally and vertically between the exterior loading position 8 and a selected and pre-programmed forward trailer-interior storage position. Crane 9 is designed to be operable to pivot each pallet 11 about a non-vertical axis within the interior cargo-carrying space of the trailer as well as externally thereof from a loading orientation as illustrated in FIG. 3 to a storage orientation within the trailer interior space as illustrated in FIGS. 5 and 6.

Each pallet 11 preferably has a plurality of "on-board" movable pallet supports, such as coupling pins 22 (FIG. 12), preferably located one adjacent each of the four corners of the generally rectangular shaped pallets. These on-board couplers are constructed and arranged relative to the predetermined pattern of cooperable fixed wall supports so as to be operable to releasably couple the associated pallet to the opposite interior walls 23 of the trailer in the storage orientation at the selected storage position. With this system the use of the vehicle carrying space within the trailer can be optimized on non-vehicle return transport trips. For example, the trailer can have the pallets 11 stored in the rear storage position supported in a stack 12 on rear floor 48. The remainder of the interior cargo carrying space on and over well floor 46, main floor 40 and porch floor 44 can then be used for hauling general cargo as typically packaged in boxes, crates and containers and provided with suitable lifting elements which can be engaged by crane 9 for loading and unloading of the same. If desired, pallets 11 can also be adapted to carry general cargo and used advantageously in accordance with the pallet supporting and loading system of the invention. Indeed, the pallets can be pre-packaged with general cargo containers by leaving a supply of pallets for loading at the shippers' facilities, and then the pre-loaded pallets arranged in transport trailer 1 with sealed and secured freight on each pallet, much in the manner of containerized shipping and with all the well-recognized advantages thereof, but now applied to a dual purpose highway vehicle transport trailer in accordance with the present invention.

It will also now be apparent from the foregoing description and drawings, with particular reference to one form of the preferred embodiments as shown in FIGS, 11 and 12, that one important feature of the vehicle transport system and apparatus of the invention is the provision of the on-board movable pallet supports 22 provided one at each of the four corners of the general rectangular pallet and extendable from the opposite sides of each pallet to thereby releasably couple each pallet to the opposite interior side walls 23 for supporting an array of loaded pallets 11 for storage in transport position in trailer 1. Preferably these fore and aft pairs of oppositely extendable on-board pallet supports are in the form of male couplers, such as the telescoping pins 22 of FIG. 12, and the opposite interior cargo-supporting side walls 23 are provided with a series of female couplers located in a predetermined array, such as the pattern of holes or perforations 21 of FIG. 10, arranged facing inwardly to the interior cargo space so as to be selectively individually cooperable with an associated fore and aft pair of male pallet couplers.

It will be noted that these female couplers (e.g., perforations 21) are arranged in a predetermined pattern and hence in a uniform array of given and known locations and are sufficient in number to cover, with relatively small incremental spacing therebetween, substantially the entire area of the side walls exposed to the interior cargo-carrying space of the trailer 1. Preferably the wall-mounted female couplers are arranged as static structures in a fixed array in first and second rows extending transversely relative to one another in the plane of the associated side wall. For example, as shown in FIGS. 11 and 12, perforations 21 are formed as circular holes in the flat sheet metal wall panel 23 and are located at uniformly spaced increments and arranged in a series of vertically extending rows labeled A, B, C, D, E, F, G and H. Perforations 21 are also arranged at uniformly spaced increments in horizontal rows labeled Nos. 1, 2, 3, 4 and 5o By providing such a predetermined pattern of female couplers in each interior side wall 23, in laterally opposed co-axial alignment with the hole pattern in the opposite side wall, such female couplers have a location in the cargo space which on the wall is predetermined and fixed. Although the incremental spacing distance of perforations within a given row, whether it be a horizontal row, a vertical row or a row at some other given angulation, can be varied, the spacing increment is kept uniform and predetermined to provide female couplers at relatively small intervals. Hence a vast excess of female couplers are provided relative to the number of pallets and associated on-board male couplers to be engaged with the cargo-carrying walls. This pallet support system thus offers pallet wall supports in an almost infinitely variable array as desired.

Since the fixed wall support pattern of static female couplers is predetermined in advance, its orthogonal cartesian coordinates in the vertical plane of the interior wall 33, i.e., the "X" or abscissa coordinate and the "Y" or ordinate coordinate, are fixed and known. Hence these pattern coordinates are readily transferable to a manual layout grid sheet or computer program for analysis and layout of each vehicle loaded pallet having a given and known elevational or vertical profile for programming a profile or silhouette layout of a given load of vehicle or other cargo relative to the interior cargo-carrying side walls. In this respect the pallets 11 preferably each comprise a generally rectangular frame work having the same predetermined length and width dimensions, as indicated by the stack 12 of pallets 11 in FIGS. 1 and 2. Moreover the pallets are generally thin and flat in elevation and readily stackable when empty. The movable pallet supports provided on each of the pallets, e.g., the male coupling pins 22 of FIG. 12, are preferably four in number, one being arranged generally at each of the four corners of the pallet in the major plane of the pallet and movable perpendicularly to the longitudinal axis of the pallet in this major plane. The pair of movable male couplers on each side of the associated pallet are thus preferably equally spaced apart fore and aft longitudinally of the associated pallet (and are coaxially aligned laterally of the pallet with the other pair of male couplers on the other longitudinal side of the pallet) to engage any associated selected pair of similarly spaced female couplets in the wall pattern with the pallet in a horizontal attitude within the cargo-carrying space of the trailer, i.e., parallel to the major plane of the lower walls 40, 44 and 48. Thus, a storage position of the pallet can be predetermined and the loaded pallet conveyed by the crane to this position, whereupon the retracted male couplers are operated to move laterally outwardly from the longitudinal sides of the pallet to a wall-engaged pallet supporting position. The on-board male couplers are retractable to a position providing suitable crane-suspended traveling clearance with the side walls with the associated pallet oriented with its major plane perpendicular to that of the side walls. As indicated schematically in FIGS. 12, 14 and 18, pallets 11 may have their four corners beveled to minimize snagging of the pallet corners on the cargo sidewalls during movement therealong, in which case the male couplers may be inset as shown in FIGS. 12, 14 and 18 (as well as FIG. 26), fore and aft as necessary out of the corner beveled areas of the pallet. However, as shown in FIG. 22 discussed hereinafter, the pallet may be completely rectangular in plan view without beveled corners and the couplers located adjacent these square ends of the pallet.

With the known pallet positions of the pallet on-board male couplers standardized, and the pallets standardized, it is a relatively simple process to pre-plot for selection any given fore and aft pair of female couplers in the fixed wall pattern which will accommodate, by crane carrying alignment therewith, the associated fore and aft male couplers of the pallet, both for any given selected horizontal position of pallet as well as angular positions of the pallet in a range of selected angles, anywhere on the interior walls of the cargo space in the trailer, as will be further exemplified in more detail hereinafter.

The foregoing palletized, self-loading vehicle transport highway semi-trailer 1 is thus readily amenable to the use of a conventional pre-programmable automatic controller 100 associated with the crane mechanism because the system of the invention relies in this preferred form on selection among predetermined fixed support parameters. With the uniform array of fixed, static female wall supports on the upright interior side walls of the cargo carrying space of the trailer, whose position is known in advance, in combination with uniform pallet dimensions and uniform locations of the male couplers on the pallets, it becomes a straight-forward task for a computer programmer to design software for in-putting the cargo configuration to be carried on each pallet and the known profile of the same, and then for a computer operator to use the program to arrange and optimize the storage pattern in side view of a multiplicity of vehicle loaded pallets by utilizing the X-Y coordinates of the fixed wall support array pattern versus the potential pallet coupler positions thereon. Likewise, suitable CNC or cad/cam-type operating mechanisms are commercially available which are controllable to control the operation of a conventional crane mechanism arranged as set forth herein so as to orient the loaded pallets to the computer plotted predetermined X-Y locations for engagement of the male pallet couplers with the female wall couplers.

In addition, the system of the invention and the pallet width dimension also lends itself to utilization of a travel crane of the type having two pairs of fore and aft vertical runs or hydraulic ram hoists spaced laterally apart and dependent from the sides of the overhead of crane framework closely adjacent the associated interior support surface of the laterally spaced interior side walls for connection individually to the laterally opposite longitudinal side edges of the pallet. With this arrangement a minimum of side clearance is required for the conveyor chains, cables or other hoisting mechanism, and the overhead clearance limitations of a cargo carrying boom arrangement are greatly reduced if not eliminated.

Another major advantage of the system of the invention is that despite the almost infinite variety of potential pallet support positions made available, the number of overall moving pallet-supporting parts is greatly reduced because the same are all located only on the pallets while the interior side wall pallet-supports are either exclusively or primarily non-adjustable static structures having no moving parts.

Hence the interior cargo-supporting side walls can be made relatively inexpensively and in a variety of configurations and optimum materials, as set forth by way of example in the embodiments discussed hereinafter. Thus, although the system of the invention produces a large excess of female couplers, this trade-off results in substantial construction and operational savings rather than wastage. Moreover, the interior facing surfaces of the side walls are preferably clear of any interiorly-protruding pallet-support structures, such as brackets 16, and hence have no potential side-clearance obstructions thereon to interfere with pallet travel within the trailer cargo space, which otherwise have to be programmed, for avoidance by each loaded pallet, into the crane controller 100 in the automatic, remote-controlled trailer load-unload system embodiments of the invention.

Further cargo capacity advantages are obtained from the particular arrangement of the highway semi-trailer 1 which is provided with the usual tandem trailer road wheels 52 and 54 disposed in the wheel wells W and mounted on a standard tandem axle and non-driven wheel suspension system (not shown) in a location adjacent but spaced forward from the rearward openable end 5 of trailer 1. These trailer wheels 52, 54 are isolated from the interior cargo carrying space of the trailer by the associated covering structure of wheel well and provide a raised cargo floor 46 which protrudes upwardly into the cargo carrying space. The trailer cargo carrying main floor 40 and rear floor 48 are arranged at elevations below the uppermost elevation of the wheel well floor 46 and extend both forward and rearwardly from wheel wells W to thereby maximize the interior cargo carrying capacity of the trailer. Further cargo capacity efficiency is obtained by using the space above the rear floor 48 as a pallet stacking storage area and converting this space into a cargo storage area when the pallets are in use. The cargo carrying space of the trailer is also securable against weather damage, vandalism and pilferage by preferably being suitably enclosed at the top, sides and bottom, as well as fore and aft of the trailer, by conventional cargo protective weather sealing exterior trailer covering structures, such as fixed or movable exterior covering walls, doors, drop tarps, etc.

The foregoing principles and novel features of the present invention as well as various refinements and improvements thereon are further illustrated in the embodiment examples of FIGS. 18–51 of the drawings, which will now be discussed in detail.

Referring first to FIG. 18, the structure at the open rear end 5 of trailer 1 is illustrated semi-schematically, but in somewhat more detail than as illustrated in FIGS. 1–6. It will be seen that the pair of conveyor runway rails 6 extend parallel to one another longitudinally of the trailer along the upper edge of the associated upright side wall structure (which includes the upright support posts 4). The rear extension 7 of runway 6 is made up of a pair of rail sections 60 and 62 each cantilevered from an associated vertical strut 64 and braced by a diagonal strut 66. Strut 64 is connected by a suitable hinge structure 68 to the rearmost wall post 4 so as to be swingable horizontally from the operative extended position shown in FIG. 18 outwardly and forwardly to an exterior travel position against the associated side wall structure. It is to be understood that the outer shroud covering 50 is suitably constructed in the area overlapping the folded-forwarded sections of runway extension 7 to accommodate such travel position.

The overhead gantry-type travel hoist or crane 9 is provided with the aforementioned double wheel end trucks comprising the fore and aft pairs of tandem wheels 70, 72 and 74, 76 on each side of the gantry frame work which run on the runway rails 6 and extension rails 60 as shown. Crane 9 is preferably constructed as a U-shaped horizontal gantry frame work comprising a pair of longitudinally extending side beams 80 and 82 interconnected at their rearward ends by a bracing platform structure 84. The crane frame work is thus open at its forward end to provide clearance for lifting a portion of a palletized vehicle through the crane frame work to thereby take advantage of the overhead clearance provided beneath the roof of the shroud structure 50 for certain selected uppermost vehicle storage positions in the trailer, as illustrated schematically in FIG. 6. Overhead crane 9 includes the conventional controller 100 and associated drive motors for individually operating the four sets of hoisting cables 13 which are wound separately on cable drums 102, 104, 106 and 108 to provide the aforementioned controllable hoisting of pallets 11 and tilting orientation motion about any non-vertical axis. It will also be understood from the foregoing that crane 9 also has a conventional travel drive mechanism (not shown) operable coupled to controller 100 for providing precision controlled travel of the crane framework along rails 6, such as a conventional drive unit gears engaging rack gears running adjacent rails 6 (not shown), for precisely positioning longitudinally of the trailer cargo space a crane suspended pallet at the appropriate longitudinal ("X") coordinates of any given predetermined selected storage locations.

It will also be better seen from FIG. 18 how the set of standardized pallets 11 are supported in stack 12 on the rear floor 48 of trailer 1. Pallets 11 are liftable one at a time from stack 12 by the crane 9 for movement outward to the rear exterior loading area 8. The pallet stack 12 is nested below the elevation of wheel well floor 46, the uppermost pallet 11 in the stack being flush therewith as shown in FIGS. 1–5. Stack 12 also nests laterally inwardly between the upright interior pallet-supporting trailer side walls 23 with a suitable amount of side clearance for crane-carried pallet travel.

Referring to FIGS. 19, 20 and 21, a modified pallet-supporting interior wall construction is shown which comprises a plurality of sheet metal perforated side wall sections 150 suitably fastened upright between modified wall posts 4' of trailer 1. Each wall section 150 is preferably formed, as by a conventional press brake or roll forming machine, from aluminum sheet material of appropriate gauge so as to have a cross-sectional configuration as shown in FIG. 20. Each wall section 150 thus has in cross-section an alternating reverse channel configuration to thereby define uniformly vertically spaced, horizontally extending rows of support channels comprising a vertical front panel 152 integrally joined at its opposite upper and lower horizontal edges to associated horizontal panels 154 and 156 which in turn are joined integrally at their respective outer edges to associated vertical back panels 158. Each interiorly protruding vertical front panel 152 is provided with a horizontally extending row of oval-shaped openings 160 equally spaced along panel 152 and each having its major longitudinal axis extending vertically. Thus when wall sections 150 are trailer installed as shown in FIG. 21, the same together provide a perforated interior pallet-carrying side wall structure having a uniform pattern of openings 160 located at predetermined known locations and forming horizontal and vertical rows of aligned support openings. The modified interior wall posts 4' may likewise be provided with oval openings 162 individually horizontal aligned with a horizontal row of the wall openings 160 to provide continuity of the wall hole pattern. Additional oval openings 164 may also be provided in posts 4' if desired to augment the wall hole pattern. Wall holes 160 as well as post holes 162 and 164 are dimensioned to receive individually therethrough the laterally extending pin 22 of the male coupling structure carried on each pallet 11 in the manner of the perforated wall embodiment of FIGS. 11 and 12. However the vertical major axis dimension of each opening 160 may be two or three times the diameter of coupling pin 22 to facilitate pin registry in a variety of selected angular positions of a given pallet when stored and supported the wall sections 150.

FIGS. 22, 23, 23A, 23B, 24 and 25 illustrate semi-schematically related embodiments of a modified vehicle carrying pallet construction, associated hoisting mechanism and modified pallet-supporting interior wall construction all in accordance with the present invention. Referring first to FIG. 22, a modified embodiment of a vehicle carrying pallet 170 is illustrated in perspective and semi-schematically, with portions of the interior structure of pallet 11 deleted for clarity. The framework of pallet 170 is provided with two pairs of oval shaped hoisting openings 172, 174 and 176, 178 along each longitudinal side of the upper surface thereof and each having their major axis extending longitudinally of the pallet. Another pair of longitudinally spaced power coupling openings 180 and 182 are provided between openings 172 and 174, and likewise another pair of such openings 184, 186 are provided between openings 176 and 178.

As shown in FIG. 24, pallet 170 is designed for cooperation with a modified overhead conveyor mechanism 190 wherein the conveyor framework 80, 82, 84 is provided with a pair of conventional hydraulically operated telescopic-ram-type lift cylinders 192 suitably mounted in conventional manner on the overhead crane framework and spaced laterally of the trailer adjacent the side walls as a substitute for the cable hoisting system of the overhead crane of FIG. 18. In lieu of hydraulically operated lift cylinders 192, conventional electric motor and geared reducer drive may be used in combination with a conventional telescopic multi-section lift truck mast type chain rigging arrangement. Conventional extensible rack and pinion or precision ball screw type hoist elements are also further alternatives to lift cylinders 192 for use with travel hoist 9. Also, when using a four end point pallet hoist system (per FIGS. 3 and 4), or even the two point central attachment system of FIG. 24, vertical hoist travel in most applications need not be varied as between laterally opposite hoist elements for operation in a single axis pallet pivoting application of the invention.

A pair of pallet lifting attachment mechanisms 194 are carried one by each ram 192 on a lowermost telescopic element 196 thereof. Each attachment 194 includes a yoke 198 fixed on ram element 196 and which in turn carries a lifting beam 200 pivotally supported thereon by a pivot axle 202. Axle 202 is journalled in yoke 198 for rotation therein and is fixed to beam 200 so that beam 200 pivots with axle 202. A helical gear 204 is fixed to axle 202 and is drivingly engaged by a worm gear 206 of an associated electric drive motor 208 mounted on yoke 198. Motor 208 is suitably operably connected to the programmable controller 100 to thereby drive, via gear 204, beam 200 to impart a controlled pivoting motion thereto about the axis of pin 202 as indicated by the arrows A and B in FIG. 24.

Each beam 200 also carries a pallet coupling, lifting and latching mechanism comprising a pair of arrow-shaped coupling heads 210 and 212 which in operation register with and are insertable through an associated pair of the side openings 172 and 174 of pallet 170. Heads 210 and 212 are suitably fixed against axial movement in beam 200 but are rotatably journalled therein for 90° rotation from the position shown in FIG. 24 to serve as quarter-turn fasteners to thereby releasably latch beam 200 to pallet 170. A conventional electric motor and gear driving unit 214 is also provided on beam 200 and operably electrically coupled to control unit 100 and mechanically coupled a lead screw shaft 216 for rotatably driving the same. Shaft 216 threadably engages helical gears 216 and 218 respectively affixed to the shafts of latches 210 and 212 for rotating the same 90° between latched and unlatched positions (FIGS. 24 and 25).

Figure 39:
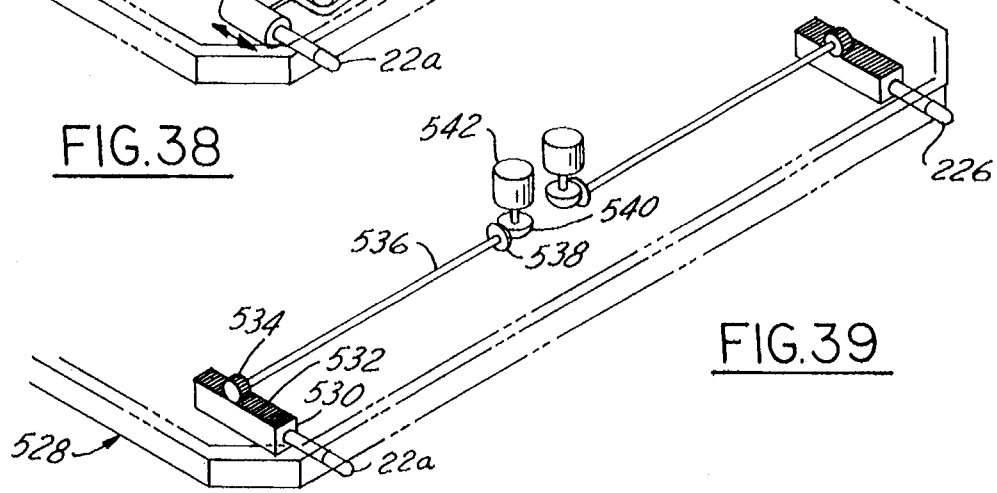
FIG. 39 is a fragmentary schematic perspective view illustrating still another form of an on-board pallet coupler operating mechanism in accordance with the present invention.
Figure 40:
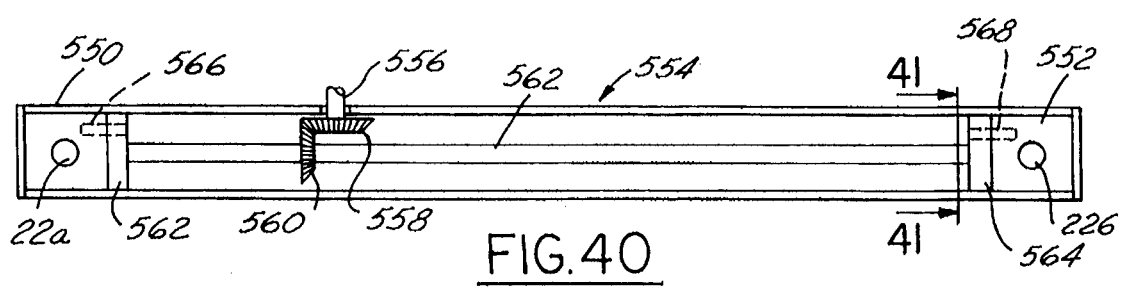
FIG. 40 is a semi-schematic side elevational view of yet another embodiment of an on-board pallet pin operating mechanism.

Beam 200 is also provided with a pair of conventional electric drive motor units 220 and 222 respectively having individually suitable output drive shaft members 224, 225 positioned to respectively register with power coupling pallet holes 180 and 182 for releasably coupling to an internal drive mechanism provided in pallet 170 (not shown in FIGS. 22 and 24) for individually operating the four male coupler units of the pallet so as to extend and retract the same to wall engaged and disengaged positions, as discussed previously in connection with the embodiments of FIGS. 11 and 12, and also in connection with the modified latching embodiment of FIGS. 39 and 40 as discussed hereinafter. Drive units 220, 222 are also suitably operatively electrically coupled to the automatic programmer 100 so as to be individually controllable to thereby couple and decouple pallet 170 from a selected registered position on cooperative interior supporting side wall panels (of the type shown in FIGS. 23, 23A and 23B).

FIGS. 22 and 23 also illustrate a modified four-corner set of pallet coupling pin mechanisms 230, 232, 234 and 236, and FIGS. 23, 23A and 23B illustrate modified interior wall supporting configurations cooperative with couplers 230 232, 234, 236 in accordance with the present invention. Couplers 230, 232, 234, 236 are provided one each at the four corners of pallet 170 and each have a bifurcated head 262 specially designed to cooperate with a specially configured pallet-supporting side wall 240 shown in FIGS. 23 and 23A (as well as with the modification thereof shown in FIG. 23B)o Wall 240 is a sheet metal corrugation having a uniform cross-sectional pattern made up of a back or rear vertical panel 242 joined to the next vertically adjacent aligned back panel 242 by an interiorly protruding shelf-like channel formation made up of a horizontal panel 244 joined integrally with a short vertical front or inner panel 246 in turn integrally joined to another horizontal panel 248. A plurality of wall sections 240 may be installed to construct each of the pallet-carrying interior side walls of trailer 1 in the manner of panels 150 of FIGS. 19-21 described previously. As shown in FIG. 23A, wall section 240 is provided with a row of uniformly spaced abutment blocks 250 fixed onto the upwardly facing surface of horizontal shelf panels 244. Alternatively, as shown in FIG. 23B, a slightly modified form of wall 240' may have such abutments provided on panels 244' and 246' by suitably cold forming raised dimples or ridges 252 and 254 in the shelf panels 244' and 248' of the wall panel material.

Each male coupler 230, 232, 234, 236 comprises a support arm 260 (FIG. 23) movably supported in pallet 170 and actuated by a coupler actuating mechanism embodied therein as described hereinafter. Rod 260 carries the bifurcated coupling head 262 which is a generally U-shaped member having a support block 264 fixed to rod 260 and a pair of outwardly protruding parallel fingers 266 and 268 (FIGS. 22 and 23). Fingers 266 and 268 together have an outside vertical dimension so as to fit slidably within the groove space defined between adjacent horizontal panels 244 and 248 and the mutually joined back panel 242, as shown in the upper position of coupler 236 in FIG. 23. The spacing between fingers 266 and 268 is dimensioned to slidably fit the fingers onto the channel shelf formed by two adjacent horizontal panels 244 and 248 and a mutually joined interior vertical front wall section 246, as shown by the lower position of coupler 236 in FIG. 23. Hence for each repeat pattern of corrugations in wall section 240 there are two uniformly vertically spaced wall engagement positions for head 236, as indicated by the elevation positions A and B in FIG. 23, positions labeled C and D in FIG. 23 likewise indicating one repeat of the dual corrugation engagement pattern. Wall 240 thus provides a relatively large bearing area for the vertical loading imposed on coupler 236 in wall engaged position when carrying a vehicle load on pallet 170. Horizontal movement of a wall-engaged coupling head 236 relative to wall panel 240 is prevented by the abutments 250.

Thus, considering first the upper coupling head 236 as engaged in wall 240 in FIG. 23, head 236 in this position operates as a male coupler entering a female pocket static structure. The female pocket is defined by the associated rear wall panel surface 242 and the horizontal shelf panels 246 and 248 integrally joined thereto to form the top and bottom and back or rear walls of the pocket. The sides of the pocket are defined by the associated two flanking abutment stops 250 on shelf panel 244, or by the four flanking abutment ridges 252 and 254 (FIG. 23B), on mutually facing shelf panels 244 and 248.

On the other hand, in the other alternative engaged position of head 236 (lowermost position shown in FIG. 23), the same operates as a female coupler, the hollow shelf formed by vertical front panel 246 and the associated horizontal shelf panels 244 and 248 joined thereto thus defining the male member which enters the socket defined between fingers 266 and 268. Again, horizontal movement of the wall-engaged coupler along the wall is restrained by the flanking stops 250 or 252, 254 disposed adjacent each of the head fingers 266 and 268. However, in both engagement modes the pallet supporting wall structure of wall panels 240, 240" is static, fixed and provides a predetermined uniformly spaced support pattern array.

To facilitate self-centering and angular re-orientation of coupling heads 236 on wall 240 when pallet 170 is oriented for a storage position inclined from horizontal, coupling heads 236 may have the upper and lower surfaces of each finger 266, 268 made slightly concave as illustrated in FIG. 22. The outer ends of each finger also may be made concave and rounded to operate in wedge-like or arrow-head fashion. Head 236 thus can slidably engage the associated corrugation of wall section 240 at the selected storage position, and, if pallet 170 is tilted from horizontal, this camming entry will rotate head 236 to the orientation thereof shown in FIGS. 22 and 23 as the same is driven into wall engagement position by rod 260 and associated coupler operating mechanism. Rod 260 is suitably mounted for such limited rotation in pallet 170, and may also be suitably yieldably spring biased to assume the stabilized on-center position of the coupling head relative to pallet 170 shown in FIG. 22 (major axis of fingers 266, 268 parallel to major plane of pallet 170). A conventional rotary coupling joint (not shown) may be provided interiorly of pallet 170 for the driving connection to rod 260 for this purpose.

Pallet 170 may also be provided with a third pair of laterally opposite, coaxially aligned male couplers 270 and 272 located at pallet longitudinal side edge midpoints. The midpoint coupler pair 270, 272 is constructed and arranged to operate in the manner of coupling pins 22 and are adapted to each engage an associated selected single wall opening 160 in wall panel 150 (for example), one on each side of the cargo space and coaxially aligned thereacross. End couplers 230-236 then may be suitably modified to either embrace a corrugation 152, 154, 156 of panel 150, or the alternatively to fit between and into the space between back panel 158 and contiguous horizontal panels 154 and 156. Also, if desired only one laterally opposite pair of end couplers need be provided. With this modification, pallet 170 need only find a single preselected X-Y coordinate storage location on the cargo side walls for releasable engagement by coupler pin pair 270, 272, thereby locating the pallet midpoint at this coordinate and fixing pallet 170 against fore and aft movement in the cargo space. The travel hoist then pivots pallet 170 about the mutual axis of pins 270, 272 to the desired storage angle, and then end couplers 230-236 are extended to engage the selected wall corrugation to thereby hold pallet 270 against pivotal movement in its storage position. Of course, wall panels 240 also may be provided with a pattern array of holes in inner panels 246 for selective engagement by midpoint pins 270, 272, in which case lugs 250 or ridges 252, 254 may be eliminated.

FIGS. 26 and 27 illustrate another embodiment of a vehicle carrying standardized pallet 300 provided in accordance with the present invention and whose exterior dimensions are similar to pallet 11. Pallet 300 is provided with an "on-board" (i.e., self-contained) pallet coupling pin actuating mechanism. Each of the four male wall-coupler pallet pins 22a, 22b, 22c and 22d, provided one adjacent each of the four corners of pallet 300, comprises a rod 302 having a bullet shaped nose 304 at its protruding free end and having a hook eye 306 at its opposite end disposed interiorly of pallet 300. Rod 302 is slidably supported in an opening 308 in a side frame member 310 of pallet 300, and also in an opening 312 provided in an interior support bracket 314 secured to an associated wheel supporting platform 316 and a bottom wall 318 of the pallet. A compression coil spring 320 encircles rod 302 and bottoms between the bracket strut 314 and a washer 322 fixed to rod 302 to thereby yieldably bias pin 22a to its fully protruding, wall-engaging position shown in FIGS. 26 and 27.

Pins 22a–d are pulled to a retracted position to bring their noses 304 flush with the associated side member 310, against the biasing force of their individual springs 320, by a system of associated retracting cables 324, 344, 346 and 348. Thus for pin 22a cable 324 has an eye 326 hooked through eye 326 of rod 302. Cable 324 is trained through a 90° bend via a bracket-supported pulley 326 mounted on another interior strut 328 of pallet 300. Cable 324 is then fed through an opening 330 of a cross strut 332 of the pallet and fastened at its opposite end to a gang yoke 334 carried on a piston rod 336 of a conventional fluid ram unit 338. A cross strut 340 of pallet 300 supports ram 338 as well as an associated storage cylinder 342 provided for supplying pressurized working fluid to ram 338.

Each of the remaining pallet/wall coupling pins 22b, 22c and 22d of pallet 300 are constructed and arranged in the manner of pin 22a and likewise cable-retracted by associated retraction cables 344, 346 and 348 respectively also connected in common to gang yoke 334. Cable 348 is trained around a pulley (not shown) similar to pulley 326 mounted on the opposite side of strut 328, whereas cables 344 and 346 are reversely trained around associated pulleys 350 and 352 which are mounted to strut 332.

Preferably ram 338 is of the air cylinder type operated by compressed air stored in tank 342. Tank 342 may be charged with compressed air from a suitable valve fitting provided exteriorly on the side of pallet 300 (not shown), and connected via a pressure supply line 354 to tank 342. Compressed air is supplied via a line 356 to ram 338 as required by pallet coupling operation.

Pallet 300 thus has both its own power supply and male coupling actuating mechanism self-contained within the pallet. The system energy may be replenished either when the pallets are hoisted exteriorly of trailer 1 or when the pallets are disposed in stack 12, as by utilizing a compressed air hose connected to the conventional compressed air brake system supply of tractor 2. The control system for operating ram 338 may be a simple conventional on-board manual button system. Alternatively or additionally, a conventional electrical control system for operating the ram valving may be provided on pallet 300, and electrical control connections made through suitable coupling electrical contacts mounted on the overhead conveyor crane mechanism. These can be provided on the lifting yoke 200 system of FIGS. 22 and 24 in place of the coupling drive motors 220 and 222, and thereby utilize pallet coupling openings 180 and 182 for electrical lead-in terminal connections. Pallet 300 is thus convertible between manual control and remote control as desired, and hence can be utilized with either the cable hoisting mechanism of FIG. 18 or the hydraulic hoisting mechanism of FIG. 24.

Figure 29:
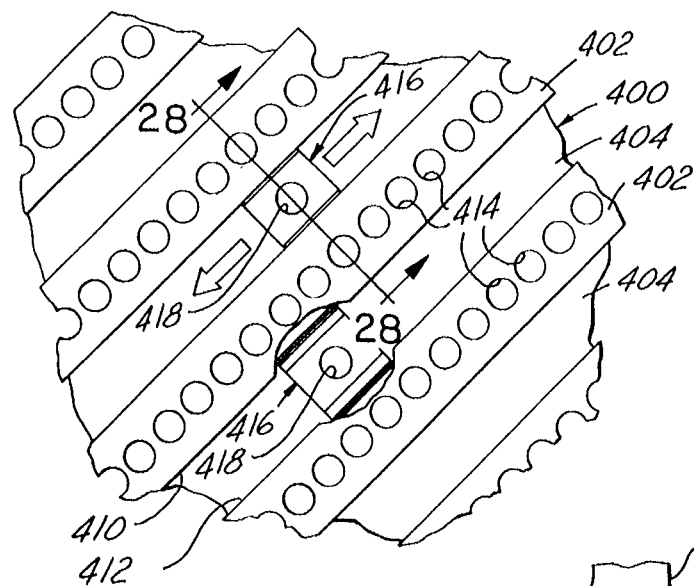
FIG. 29 is a fragmentary elevational view of a further modified form of pallet-supporting interior side wall construction in accordance with the invention.

FIGS. 28 and 29 illustrate another modified pallet-supporting interior side wall construction for trailer 1 in which the wall is made up of wall panel sections 400 extruded from sheet material and which may be mounted in the manner of wall sections 150 of FIG. 21. Wall section 400 has a corrugated configuration in cross section as shown in FIG. 28 made up of vertically spaced interior front wall panels 402 alternating vertically with exterior facing rear wall panels 404 which are mutually integrally interconnected by vertically spaced horizontal shelf panels 406 and 408. Each front wall panel 402 is connected to the associated horizontal shelf panels 406 and 408 by return bend portions 410 and 412 which in turn define longitudinally extending retaining and reinforcing ribs running lengthwise along each wall section 400. Front wall panels 402 each have a lengthwise row of uniformly spaced circular holes 414 to provide a predetermined pattern of pallet-supporting perforations in the interior side wall constructed from sections 400 for selective engagement by the male coupling pins of the vehicle carrying pallets 11 or 300. As shown in FIG. 29, wall sections 400 may be mounted so that the longitudinal axes of the corrugations, and hence the rows of perforations 414, run diagonally at, for example, a 45° angle to horizontal. Alternatively, the panel may be mounted so that the perforation rows extend vertically or horizontally.

As an additional optional feature of wall section 400, a slider block 416 may be slidably entrapped in each channel defined by and between a rear panel 404 and associated shelf panels 406 and 408 and ribs 410 and 412, as shown in FIG. 28 and 29. Block 416 is thus slidable along this channel between a pair of associated adjacent front wall panels 402. Block 416 has a center bore hole 418 of the same diameter as wall hole 414 for receiving a pallet coupling pin 22 therein.

The interior wall construction utilizing panels 400 (when not equipped with slider block 416) can be used in the same manner described previously in conjunction with perforated trailer side wall panels 23 or 150. With the addition of slider blocks 416, the same can be slid down to a storage position spaced a suitable distance above the trailer floor against suitable stop blocks (not shown) provided in the channel runways for the blocks. Hence blocks 416 in storage position can be located at a given predetermined position on the trailer interior side wall. With the block storage positions thus known, the programmed control of the pallets can be designed to manipulate a given pallet to register a pair of laterally opposed pallet pins 22 (e.g., the aft pair) with a pair of laterally opposed wall slide blocks 416 and pins operated to wall engaging position to thereby insert the pins within the registered block openings 418. Then controlled conveying movement of the pallet can be continued to thereby slidably drag the pin-engaged blocks 416 with the pallet until the other pair of pallet coupling pins (e.g., the forward pair) are registered with a pair of laterally opposed wall openings 414. Then the forward pair of pins are actuated to wall-engage the same and thereby secure the pallet to the wall in a given fixed position. Slider blocks 416 thus may be provided to augment the static wall structure by increasing the possible potential number of angular locations of pallet transport positions within the interior cargo space of trailer 1.

Figure 31:
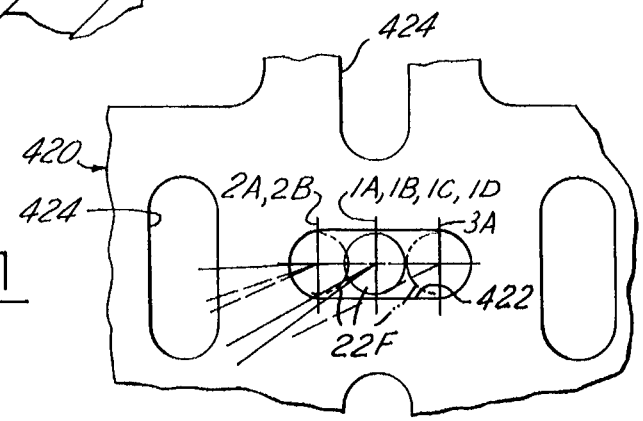
FIG. 31 is a fragmentary view of a portion of the wall of FIG. 30 greatly enlarged thereover and illustrating the various positions of a forward one of the pallet couplers in a given selected wall opening for the selected positions illustrated in FIG. 30 of the rear pallet couplers relative to the illustrated embodiment of an interior supporting wall hole pattern.
Figure 30:
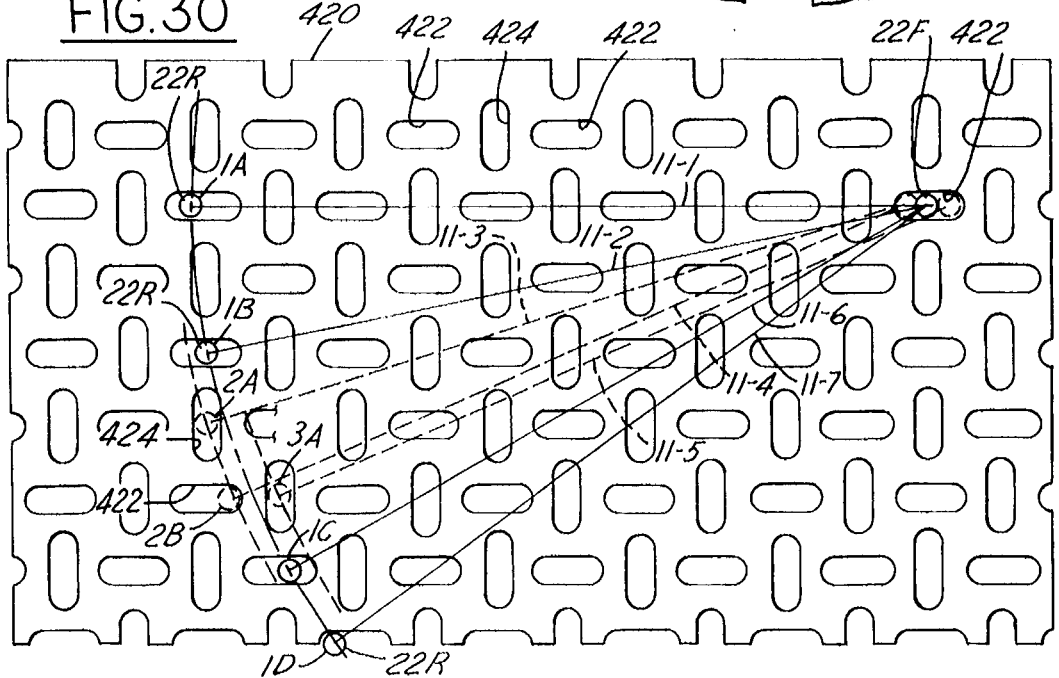
FIG. 30 is a fragmentary elevational view of another embodiment of an interior pallet supporting side wall construction in accordance with the invention and illustrating diagrammatically a series of selected pallet supporting positions thereon.
Figure 32:
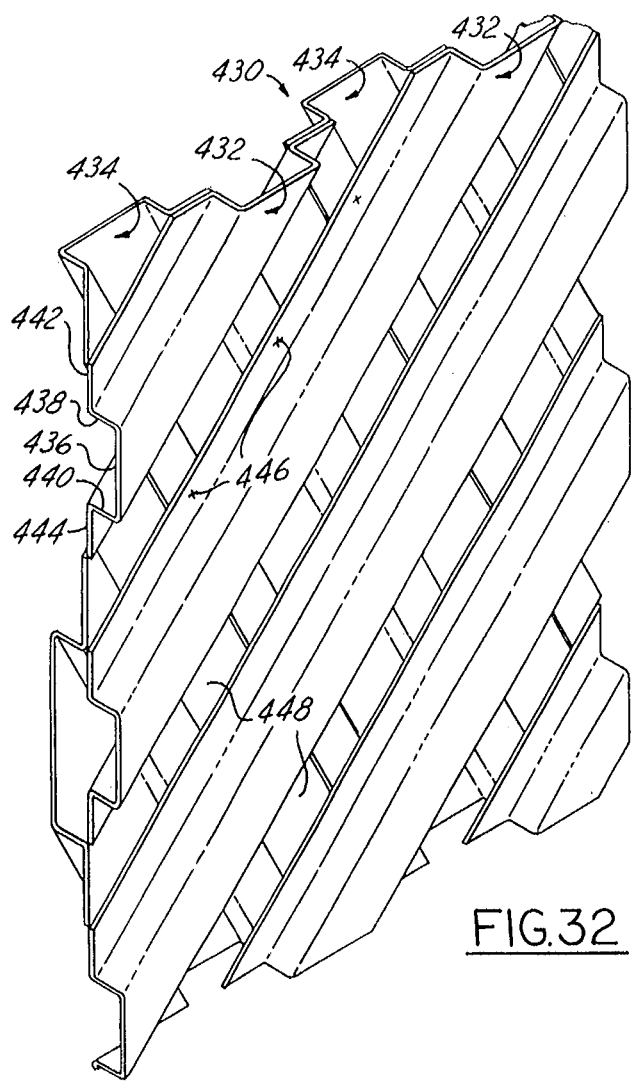
FIG. 32 is a fragmentary perspective view of still another embodiment of interior pallet-supporting side wall construction in accordance with the present invention.

FIGS. 30 and 31 illustrate still another embodiment of a pallet-supporting interior side wall construction for trailer 1 of the present invention. In this wall construction one or more flat metal sheet or plate panel sections 420 are installed in a manner similar to wall panels 23 of 150 described previously to construct the interior surface of the laterally opposed trailer side walls which again extends throughout the interior cargo carrying space of the trailer. Panel 420 is provided with a predetermined uniform pattern of pallet pin support oval holes 422 and 424 all equal in size and shape. However, holes 422 are arranged with each of their major longitudinal axes horizontal, and are aligned in horizontal and vertical rows at equally spaced horizontal and vertical spacing increments. On the other hand, holes 424 are arranged with each of their major longitudinal axes vertical, but are also arranged aligned in horizontal and vertical rows at equally spaced horizontal and vertical spacing increments. Holes 422 and 424 thus alternate with one another to again provide a uniform predetermined hole pattern both horizontally and vertically of panel 420.

FIGS. 30 and 31 also diagrammatically illustrate how a given pallet 11 with a pair of associated fore and aft pallet supporting pins 22F and 22R respectively can be selectively positioned for support on panel 420. Pallet 11 is schematically represented in seven selected positions of different angular orientation labeled 11-1 through 11-7 in FIG. 30. Pin 22F is shown registered with a selected one of the horizontal holes 422 in FIGS. 30 and 31, whereas pin 22R is shown registered with seven different selected panel holes, one for each angular location 11-1 through 11-7. It will be seen that pin 22R can be registered with five of the horizontal holes 422 and two of the vertical holes 424 to establish these seven positions of pallet angular orientation.

As best seen in FIG. 31, as pallet 11 is moved between each of the seven orientations 11-1 through 11-7, pin 22F can shift horizontally back and forth in its registered hole 422 between (1) a position centered therein, labeled 1A through 1D, (2) a rearward position therein labeled 2A and 2B, (3) and a forward position therein labeled 3A. Thus, in the horizontal pallet position 11-1, with aft pallet pin 22R registered in another horizontal hole 422, forward pallet pin 22F may occupy center position 1A–1D in its horizontal mounting hole 422. Likewise, for pallet position 11-2, with aft pallet pin 22R now occupying the next lower horizontal hole 422, pallet pin 22F can still remain in center position 1B-1D. However, when pallet pin 22R is registered into a vertical hole 424 selected for pallet position 11-3, pallet pin 22F moves rearwardly in its registered hole 422 to rear pin position 2A–2B therein. In pallet position 11-5 pin 22F is shifted in its registered hole 422 to forward position 3A in FIG. 31. Hence, the combination of horizontal and vertical oval holes of panel 420 enables a wide variety of angular positions to be selected and programmed for storage location of a given pallet 11 in the interior of trailer 1. Of course, it will now be seen that the reversal of this hole selection in the support array pattern is also possible, i.e., first registering aft pin 22R in a given wall hole 422 or 424, and then pivoting the pallet through an angular range of positions with the pivot point being the rear pin 22R, so that forward pin 22F can pick up selected holes that register with the arc of swing thereof from the aft or rear pivot point.

It will also be understood that panel 420 may be further provided with a predetermined pattern array of circular holes 21 (not shown in FIG. 31) disposed individually intermediate the pattern array of oval slots 422, 424 for selective engagement by either the forward pair of pins 22F or rearward pin pair 22R, while the other pin pair engages a selected slot 422 or 424, if fore and aft pallet movement needs to be further restrained in this system.

Figure 33:
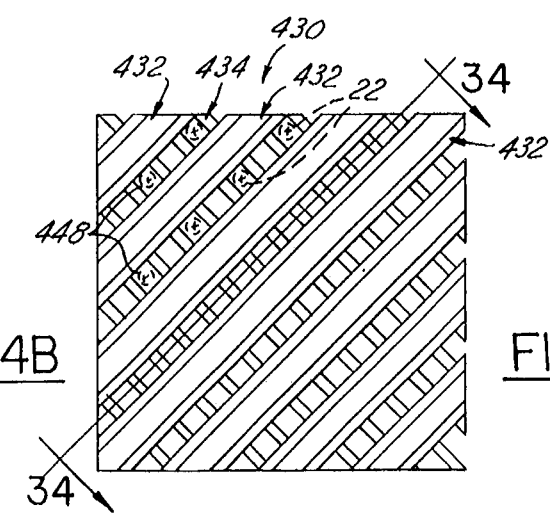
FIG. 33 is a fragmentary elevational view of the wall construction shown in FIG. 32.

FIGS. 32, 33, 34, 34A and 34B illustrate a still further modified embodiment of an interior trailer side wall pallet-supporting construction. A wall panel 430 of this construction may be erected to cover the entire interior dimension of the cargo-supporting side wall of trailer 1, or again may be made in sections similar to panels 150 for attachment between upright posts 4 or 4'. Panel 430 is made up of an "X"-type array of separate but interconnected respectively interiorly and exteriorly disposed metal channel sections 432 and 434 which are oriented with their respective longitudinal axes perpendicular to one another. Channels 432 and 434 are identical in cross section and each have a center web wall panel 436 and leg sections 438 and 440 extending parallel to one another from the opposite edges of web 436, perpendicular to panel 436, and terminate in flanges 442 and 444 respectively extending parallel away from one another in a common plane. In assembly, flanges 442 and 444 of each interior channel 432 lay flat against flanges 442 and 444 of each exterior channel 434 and are connected thereto as by spot welds 446. Each interior channel 432 is parallel to and spaced a given distance apart from its next adjacent interior channel 432, and the same is true as to the orientation and spacing from one another of exterior channels 434. Due to this channel spacing and this interconnected "X" wall channel latticework lay-out, a multiplicity of pallet pin registering holes 448 of square diamond shape are automatically provided in a predetermined pattern spaced uniformly from one another and aligned in horizontal and vertical rows. The potential selective registration positions of pallet supporting pins in this "X" wall latticework is indicated in FIG. 33 by the broken line circles 22.

Figure 34:
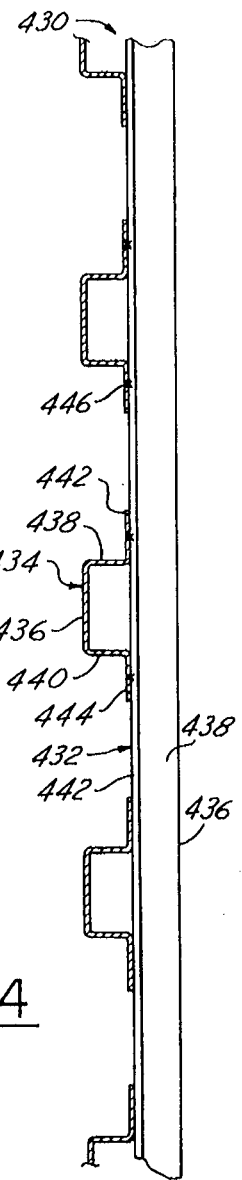
FIG. 34 is a cross-sectional view taken on the line 34—34 of FIG. 33.
Figures 34A, 34B:
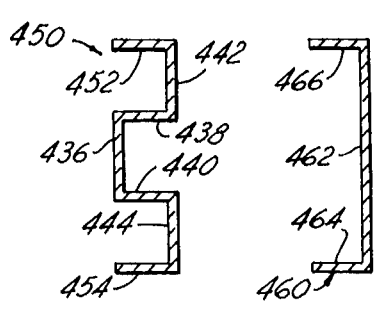
FIG. 34A is a transverse cross-sectional view of a modified form of channel for use in the wall construction of FIGS. 32 and 33.
FIG. 34B is a transverse cross-sectional view of still another form of channel construction usable in the wall construction of FIGS. 32 and 33.

As indicated by the modified wall panel channels 450 and 460 of FIGS. 34A and 34B respectively, different types of channel cross section configurations can be used in this X-type wall latticework. In FIG. 34A the configuration of modified channel 450 has the same center web panel 436, legs 438 and 440 and flanges 442 and 444 as channels 432 and 434. However, channel section 450 has two additional integral flanges 452 and 454 which extend parallel to one another from the respective outer edges of flanges 442 and 444 to terminate flush with the plane of web 436. Channels 450 are assembled in an X-array of interior and exterior channels in the manner of panel 430 and then are oriented and fixedly joined together in the same latticework manner. However, flanges 452 and 454 of the exterior channels protrude exteriorly of the wall towards the exterior of the trailer, whereas the flanges 452 and 454 of the interior channels protrude inwardly. Thus, these additional flanges 452 and 454 form four flat supporting surfaces defining a box-like boundary wall around each of the pallet pin openings 448. This channel configuration therefore increases the load bearing surface and load supporting capability of the wall for each pin carried in a given selected hole location in the wall, thereby enabling each channel to be made of thinner gauge metal for a given load rating.

The modified embodiment of the wall section channel 460 shown in FIG. 34B illustrates the use of a simple standard "C-" type channel section having a center web panel 462 and two parallel flanges 464 and 466 extending parallel to one another respectively from the opposite edges of web 462. Channels 460 are again arranged in the lattice work manner of wall panels 430 with the exterior channel flanges 464 and 466 facing exteriorly of the trailer and interior channels flanges 464 and 464 facing interiorly, the channels again being spot welded back-to-back at the mutually overlaid portions of their center web panels 462. Again flanges 464 and 466 of each channel 460 provide flat supporting surfaces for cradling an associated pallet supporting pin registered in a selected opening in the hole pattern defined by and between the X-array of interior and exterior back-to-back laterally spaced apart latticework channels.

The X-frame work of wall sections of FIGS. 32–34B thus provide a pallet supporting interior wall construction for trailer 1 which can be made up or readily available "shelf-item" hot-rolled or extruded stock channel sections, and can be readily fabricated and assembled offsight or in-situ. Additionally, as best seen in FIG. 33 the diamond shaped wall openings 448 formed by this latticework tend to securely cradle the cylindrical pallet pins 22 registered and resting therein.

Figure 35:
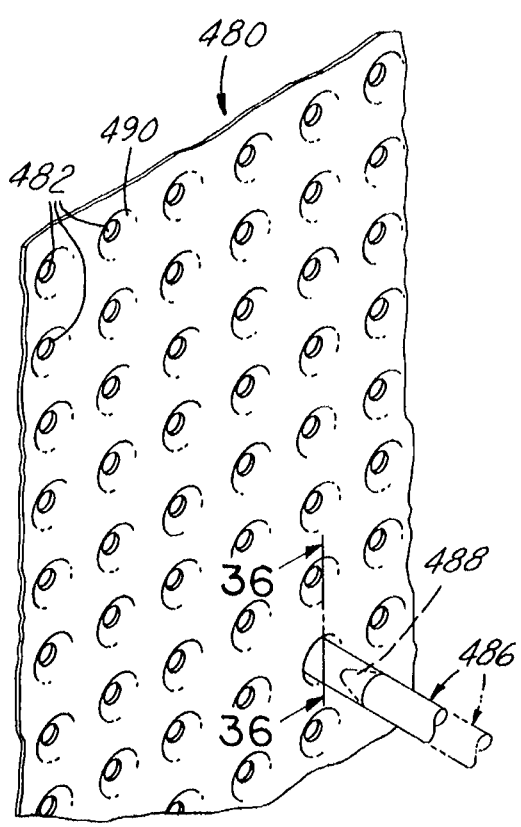
FIG. 35 is a fragmentary perspective view of yet another embodiment of an interior pallet-supporting interior side wall with a hole perforation pattern similar to that of FIG. 11 but having a modified hole formation structure.
Figure 36:
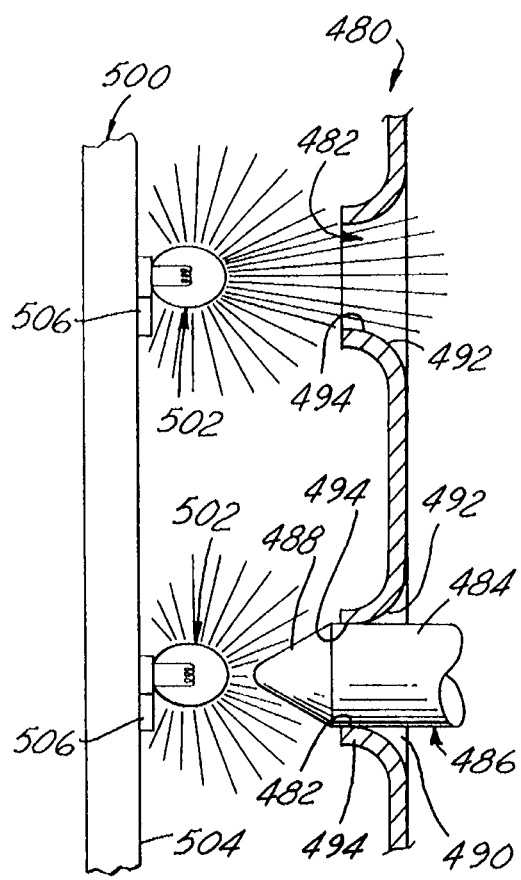
FIG. 36 is a fragmentary cross-sectional view taken on the line 36—36 of FIG. 35, and also further illustrating fragmentarily and schematically an associated trailer exterior wall disposed outboard of the interior pallet supporting wall and equipped with selectable wall opening illuminating devices and pallet pin detecting devices also in accordance with the present invention.

FIGS. 35 and 36 illustrate another modified embodiment of a wall panel 480 similar to wall 23 in being made from flat sheet metal and having horizontal and vertical rows of circular pallet pin supporting openings 482 therethrough. However, wall panel 480 is embossed or indented around each opening 482 to define a curved conical pin guideway 490 facing the cargo space of trailer 1. As best seen in FIG. 36, each indentation 490 is defined by an annular convex surface 492 leading from the flat trailer interiorly facing surface of panel 480 smoothly into a cylindrical pin-supporting surface 494 which thereby defines circular opening 482. The pallet pins 486 provided for use with panel 480 are preferably formed with a cylindrical shank 484 to slidably fit within opening 482 and rest on wall surface 494. The nose 488 of pin 486 is conically pointed to facilitate camming entry and registry of pin 486 into the selected wall opening 482. The conical and cylindrical support surfaces 492 and 494 forming each wall opening 482 also provides a strengthened and load-spreading support structure for carrying the pallet pins, as well as stiffening wall panel 480, thereby increasing the load bearing strength-to-weight ratio of the wall array of panels 480.

FIG. 36 also illustrates another optional feature of the invention, namely providing an exterior wall panel 500 mounted to the exterior side of the wall posts 4 or 4' and spaced outwardly from the associated interior wall panel 480. Panels 500 thus can be constructed to function as the exterior side shroud panels of shroud 50 as described previously for enclosing the trailer 1 with a protective outer surface covering. Panels 50 thus may be of any suitable conventional construction as currently employed in truck trailer outer sheathing panels. Outer wall 500 provides a mounting platform on its interior surface 504 for supporting an array of conventional illuminating devices, indicated schematically in FIG. 36 at 502 and 504. Each illuminating device 502 is suitably located on surface 504 of panel 500 facing the exterior surface of panel 480 and generally in alignment with an individually associated pallet pin mounting opening 482 in panel 480 to provide selective illumination of openings 482 visible from the interior cargo space of trailer 1. Preferably conventional solid state illuminating devices, such as a light emitting diode (LED), may be utilized and suitably grid-wired in a conventional manner for this purpose, as will be well understood by those skilled in the illuminated moving sign art. This array of illuminating devices 502 is oriented to correspond to the X and Y coordinates of the wall pattern of wall holes 482 and thus can be programmed through use of a suitable electrical control system and programmer operable to light up a selected spaced apart pair of wall perforations 482. These two perforations then are readily visible from the interior cargo carrying space of trailer 1 by light shining therethrough. Since these illuminated pallet-receiving holes correspond to the proper selected pallet pin receiving positions for a given pallet storage position, accuracy, reliability and ease of the pallet loading and storage operation is thereby enhanced for the operating personnel involved in sequential loading of pallets 11 in a given pre-programmed array in trailer 1.

In addition, illuminators 502 may be combined with conventional light reflection or intensity detecting devices 506 individually mounted at each illuminating device location. Sensors 506 are each openable to provide a signal to a suitable conventional sensing and display system operable to immediately indicate to the loading personnel the presence or absence of a pallet pin registering with the appropriate illuminated selected wall hole, thereby further insuring correct positioning and storage securement of pallets in the cargo carrying system.

Figure 37:
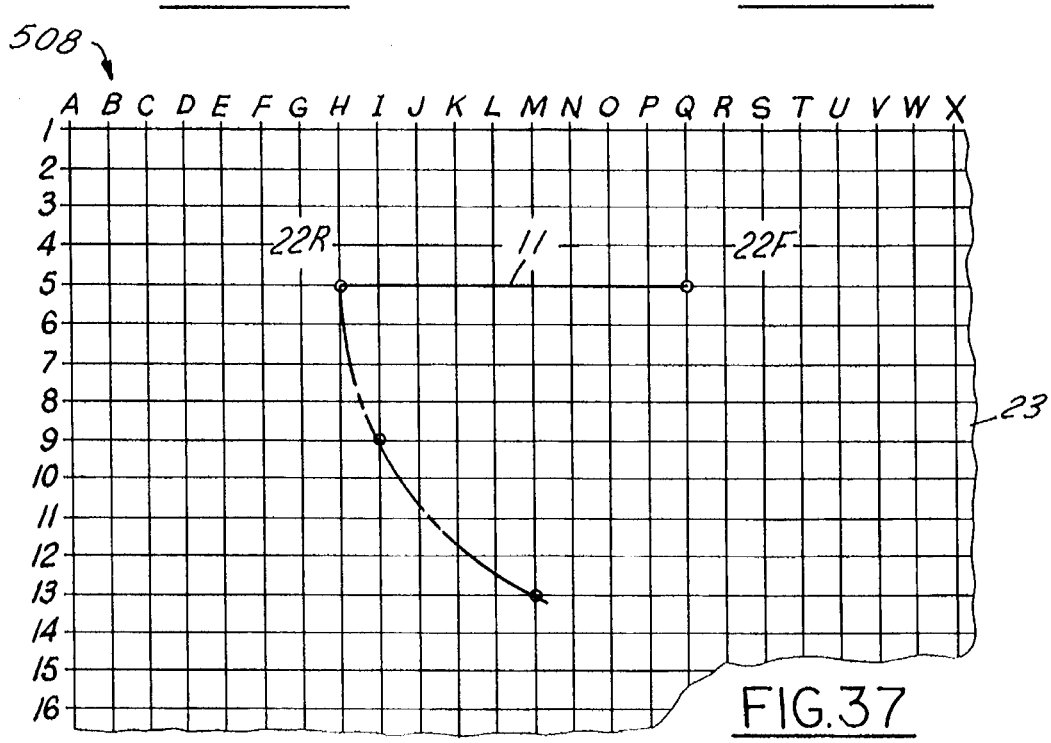
FIG. 37 is a graphic layout of an interior pallet supporting wall surface illustrating one example of how various pallet storage positions may be plotted and programmed for a given pattern of pallet support points on the wall.

FIG. 37 is a diagrammatic illustration representative of an interior pallet supporting trailer side wall layout pattern 508 in accordance with the invention compatible with any of the previously described interior wall support structures. The hole locations in wall pattern 508 are indicated by the graph grid wherein the abscissa coordinants are labeled "A" through "W", and the ordinate coordinants labeled "1" through "16" (i.e., the X and Y orthogonal coordinants in the plane of each of the trailer side walls). As will be understood from the description previously set forth herein, the hole pattern 508 for each trailer side wall is aligned laterally of the trailer cargo space coincident on the "Z" axis with that of the laterally opposed trailer side wall. In FIG. 37, by way of example, the front or forward pair of pins 22F of a given pallet 11 are shown registered with opposed laterally aligned wall holes P-5. The aft or rear pair of pins 22R of pallet 11 are shown registered with opposed wall holes II-5. Pallet 11 can be pivoted (in a computer program simulation) about point P-5 with forward pins 22F serving as the pivot point to thereby pick up a pair of opposed wall holes I-9 or another pair of opposed wall holes M-13 in this particular uniform grid layout. Additional selected angular positions of pallet 11 may be obtainable by suitably programming and utilizing the variations in hole shape, size and layout of the wall panel constructions as described previously herein.

Also, one laterally opposed pair of coupler pins 22F or 22R, such as pins 22a in pallet 528 and associated rack blocks 530 of FIG. 39, may be suitably movably supported for compound movement on the pallet, i.e., bodily moved fore and aft as well as extend and retract. For example, a suitable cross-slide-type carriage may be mounted within the pallet framework so that the pin pair 22R can be adjusted slightly fore and aft of the pallet. In this way, a small variation in the spacing of pin pair 22R from pin pair 22F longitudinally of the pallet can be obtained to permit pins 22R to be adjusted fore and aft of the pallet for selective alignment with the additional wall holes located at coordinates between II-5 and I-9 and between I-9 and M-13, for example.

Figure 38:
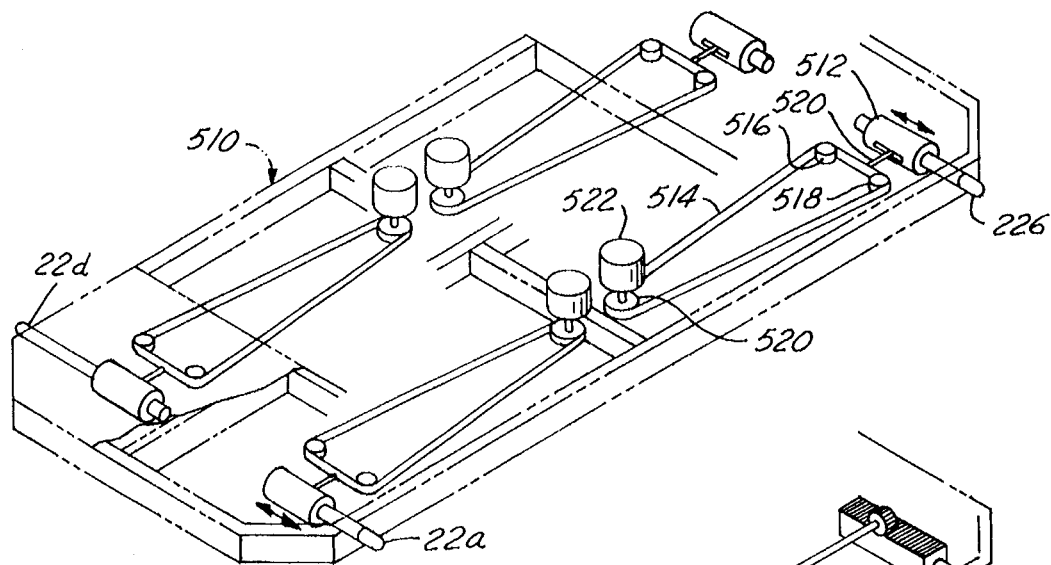
FIG. 38 is a fragmentary schematic perspective view illustrating a modified vehicle supporting pallet construction incorporating another form of on-board wall coupler operating mechanism also in accordance with the present invention.

FIG. 38 illustrates another embodiment of an on-board pallet pin actuating system also in accordance with the present invention. Each pallet 510 of this embodiment is standardized and laid out dimensionally similar to pallets 11, 170 or 300. Each of the four corner pallet support pins 22a–d is fixed to an associated carrier sleeve 512 suitably slidably mounted within the interior of the pallet such that the associated pallet pin is movable axially between a retracted position and a protruding wall-engaging position. Pin carriers 512 are independently driven between their respective operating positions by an associated reversible drive chain or belt 514 trained in a continuous loop around associated sprockets 516, 518 and 520. The chain run between sprockets 516 and 518 is provided with a connector member 520 drivingly interconnecting this driving run of chain 514 with sleeve 512 such that sleeve 512 is chain moved in either direction between sprockets 516 and 518 the appropriate distance necessary to retract and extend the associated pallet supporting pin. Each chain 514 is controlled by a conventional servo motor 522 operable to drive main sprocket 520, and suitable power and control connections to motor 522 may be provided to pallet 510 from the overhead crane system in the manner of the embodiment of FIG. 24 described previously. Alternatively, each drive sprocket 520 may be suitably mechanically coupled to be driven by the disconnectable mechanical drive elements provided on the hoist, such as elements 220 and 222 described previously in connection with the embodiment of FIG. 24.

FIG. 39 indicates schematically another standardized pallet 528 provided with another embodiment of a pin driving system which may be employed in accordance with the invention. In the system of FIG. 39 each pallet pin 22A–22D may be individually mounted to an associated rack gear block 530 provided with rack gear teeth 532 and driven between retracted and extended positions by engagement with a driving pinion gear 534. A rotary drive shaft 536 carries gear 534 and also a bevel gear 538 driven by an associated bevel gear 540 of a servo motor 542. Again, and alternatively, a disconnectable mechanical driving connection can be substituted for motor 542 on pallet 510, and constructed and arranged for releasable engagement with hoist-carried driving elements insertable through the coupler holes 180 and 182 of pallet 170 of FIG. 22 described previously in conjunction with the power drive system of the hoisting system of FIG. 24.

Figure 41:
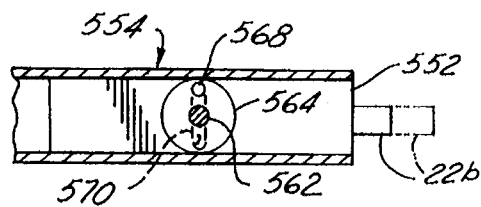
FIG. 41 is a part-sectional view taken on the line 41—41 of FIG. 40.
Figure 42:
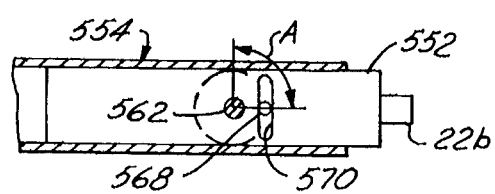
FIG. 42 is a view similar to FIG. 41 showing the pallet pin of FIG. 41 extended outwardly from the pallet a wall engaging coupling and support position.

FIGS. 40, 41 and 42 illustrate semi-schematically yet another embodiment of a driving system for the pallet pins in accordance with the invention. In this system the pallet pins illustrated at 22a and 22b are mounted for sliding movement between their extended and retracted positions on respective slide blocks 550 and 552 suitably supported within the interior framework of a modified pallet 554. Pins 22a and 22b may be conjointly driven by a single drive system comprising a driver shaft 556 carrying a bevel gear 558 which meshes with an associated bevel gear 560 mounted on a drive shaft 562. Shaft 562 carries discs 562 and 564, one on each of its opposite ends, which are rotatably mounted in the framework of pallet 554 adjacent each associated slide block 550 and 552. Each disc 562, 564 respectively carries an associated actuating cam pin 566, 568 which protrudes from the side of the disc and registers with an associated vertical cam slot 570 provided in the facing side of the associated block 550 and 552 (FIGS. 41 and 42).

Controlled rotation of discs 562 and 564 by shaft 562 causes cam pins 566,568 to swing through an arc A (FIG. 42) of 45° between its positions shown in FIGS. 41 and 42 respectively, thereby extending pallet pins 22a and 22b between retracted and extended positions (respectively shown in FIGS. 41 and 42). It will be noted that the over-center relationship of cam pins 566, 568 to the rotational axes of discs 562, 564 when cam pins 22a, 22b are in the coupling pin extended position of FIG. 42 provides a self-locking feature to prevent retraction of pins 22a, 22b from their extended position when in wall registry.

Figure 43:
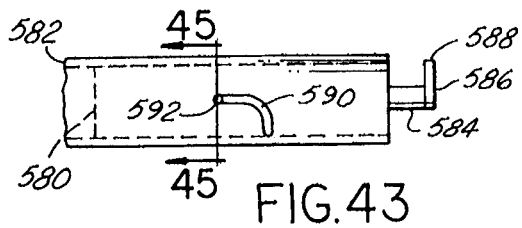
FIG. 43 is a fragmentary schematic illustration of still another embodiment of a pallet pin operating mechanism for a pallet pin provided with a locking tab thereon, the coupler being shown in retracted position.
Figure 44:
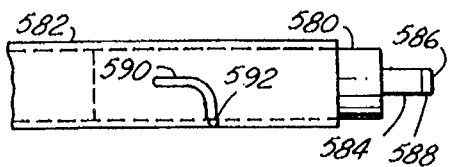
FIG. 44 is a view similar to FIG. 43 showing the embodiment of FIG. 43 extended to a wall engaging and locking position.
Figure 45:
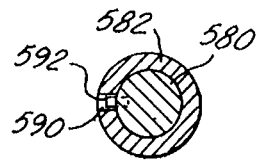
FIG. 45 is a cross-sectional view taken on the line 46—46 of FIG. 43.

FIGS. 43, 44 and 45 illustrate a further modification of the pallet supporting pin operating mechanism provided with a locking latch feature also in accordance with the invention. In this embodiment a cylindrical slide block 580 is slidably and rotatably mounted in a suitable sleeve housing 582 provided interiorly of the framework of pallet 11 or pallet 528 of FIG. 39 as a substitute for each of its carrier blocks 532. Block 580 is driven for movement in the direction of its axis between an extended wall-engaging and latched position (FIG. 44) and retracted wall-disengaged position (FIG. 43) by a suitable drive mechanism, such as that described previously in conjunction with pallet 510 of FIG. 38 or pallet 528 of FIG. 39. Each support block 580 carries a pallet-supporting pin 584 affixed to the outer end of block 580 coaxially therewith. A locking finger 586 is affixed to the free end of pin 584 and protrudes radially to a free end 588 spaced radially outwardly a given distance from the axis of rotation of pin 584. Sleeve 582 has a cam slot 590 which extends generally axially and then circumferentially along the wall of sleeve 582 in a predetermined cam pattern path. Block 580 is provided with a cam pin 592 which protrudes from the surface of block 580 (FIG. 45) into cam slot 590 to impart a predetermined quarter-turn reversible rotation to block 580 and thus pallet pin 584 during movement of block 580 axially within sleeve 582 on the pin extension and retraction strokes.

As will be seen in comparing the retracted position of pin 584 in FIG. 43 with its fully extended position in FIG. 44, initial axial movement of block 580 from its retracted position causes pin 592 to ride in the axially extending portion of cam slot 590. During such travel latching finger 586 is maintained angularly aligned in the wall-entry position of FIG. 43 (major axis of finger 586 aligned parallel to the major axis of an associated oval wall opening) until both finger 586 and pin 584 have entered the selected pallet supporting wall opening, such as an oval opening 160 in panel 150 of FIGS. 19–21. Then during a last increment of outward movement of block 580 in its extension stroke, after latching finger 586 has moved through the wall opening 160 so as to clear the wall exterior surface, this final travel of pin 592 in the curved, circumferentially extending portion of cam slot 590 will impart the quarter-turn (90°) rotation to block 580 and hence to finger 588 to bring it into the wall latching position of FIG. 44. Finger 586 is dimensioned such that in this position, it cannot be pulled back out of the wall hole, and hence the pallet supporting pin 584 is locked in wall engaged position. When retraction of block 580 is initiated the reverse sequence occurs, pin 592 then being cammed by the pattern of cam slot 592 to initially impart a reverse quarter-turn rotation to orient locking finger 586 to its unlatched position of FIG. 43 so that it then can be withdrawn from the wall hole as the pallet pin is then further fully retracted into the pallet.

Figure 46:
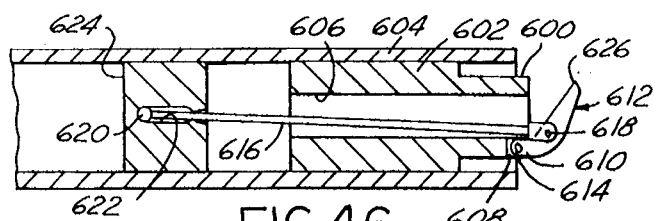
FIGS. 46 and 47 are fragmentary semi-schematic views of still another embodiment of a male coupler pallet support pin provided with a lost motion-type latching mechanism, the pin being shown retracted in FIG. 46 and extended and latched in FIG. 47.
Figure 47:
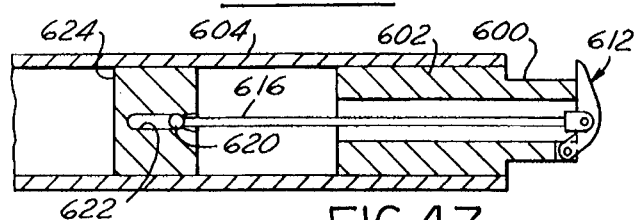

FIGS. 46 and 47 schematically illustrate another form of pallet pin latching or locking mechanism which may be employed, for example, in the pallet driving system of pallet 510 of FIG. 38. In this embodiment a pallet supporting pin 600 may be formed as a reduced diameter integral extension of a pallet supporting block 602 which in turn is supported for axial sliding motion on an extension and retraction strokes by a suitable guide tube 604. Block 602 and pin 600 have a central through bore 606, and the outer end of pin 600 is provided with a notch 608 in which one end 610 of a latch finger 612 is pivotably mounted by a pivot pin 614. A latch actuating rod 616 extends through bore 606 and is pivotably connected by a pin 618 to the approximate center of latch body 612. The opposite, interior end of rod 616 carries a cross rod 620 which is slidably engaged in a lost-motion keeper slot 622 provided in a block 624 stationarily mounted within sleeve 604.

In the retracted position of pallet supporting pin 600 shown in FIG. 46, it will be seen that latch 612 is pivoted outwardly away from the free end of pin 600 so that the free end tip 626 of latch 612 is generally flush with the OD of pin 600 and hence can enter a circular wall opening sized to receive pin 600. It will be noted that latch 612 has been forced to this open position as rod 616 has been carried rearwardly within block 602, due to its connection at 618 to latch 612, to drive keeper 620 to the rearward end limit of its travel in slot 622 where it abuts the rear end of slot 622. If desired, latch 612 also may be spring biased to the unlatched position of FIG. 46 by a suitable wrap spring (not shown) engaged with latch 612, pivot pin 614 and notch 608 in a conventional manner.

When carrier block 602 is forced on its pin extension stroke from the position of FIG. 46 to the wall-engaging position of FIG. 47, rod 616 is pulled along by its connection to the latch for the distance of the lost motion coupling provided by keeper slot 622. Keeper 620 on rod 616 first strikes the forward end of slot 620 after latch 612 enters the registering wall hole, and after pin 600 has likewise been registered and inserted into the selected wall hole to a pallet supporting position, and thus during the last increment of extension travel. Final extension motion of block 600 in the last increment of its outward travel, while rod 616 is now so restrained by keeper 620, causes relative motion between rod 616 and latch 612 which is operable to pivot latch 612 to its closed latching position shown in FIG. 47. In this latched condition pallet pin 600 is thus securely locked onto the trailer interior supporting side wall.

To unlatch pin 600, the pin extension drive is reversed to pull block 602 rearwardly. The first increment of retraction travel pivots latch 612 to the unlatched position of FIG. 46 to allow it to clear the wall hole as pin 600 is being retracted therefrom. Thereafter the lost motion coupling between rod button or pin 620 and block 624 by way of slot 622 enables rod 616 to be retracted along with carrier 602 to the fully retracted position shown in FIG. 46.

Figure 48:
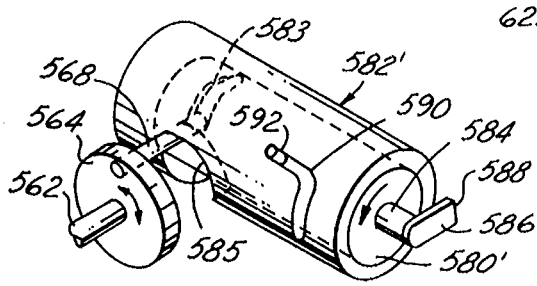
FIGS. 48 and 49 are fragmentary semi-schematic views of another form of pallet pin operating mechanism for a pallet pin having a locking finger, the same being shown in retracted position in FIG. 48 and extended and locking position in FIG. 49.
Figure 49:
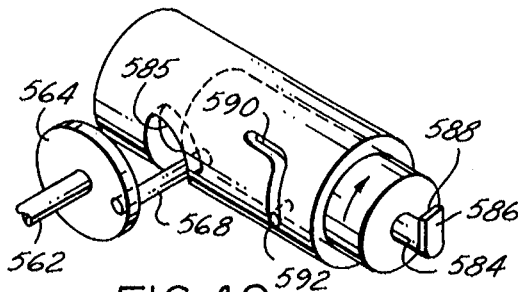

FIGS. 48 and 49 show schematically how the disc pin drive of the pin driving mechanism of FIGS. 40–42 may be applied to the quarter-turn locking finger type latching mechanism of FIGS. 43–45. A modified slide block 580' of cylindrical shape is slidably and rotatably carried in the modified cylindrical sleeve housing 582' sleeve 582' being held stationarily fixed in the associated pallet. Block 580' is provided with an external cam groove slot 583 which extends circumferentially in a plane perpendicular to the axis of block 580' for approximately one quarter of the circumference of block 580'. Housing sleeve 582' is provided with a clearance notch 585 which extends through the wall of sleeve 582' for registry access to cam slot 583 during its limited travel with block 580' within sleeve 582'. The cam pin 568 of disc 564 protrudes through housing notch 585 so that its free end registers in cam slot 583. Thus a quarter turn of rotation of disc 564 will cause pin 568 to propel slide block 580' from its retracted position shown in FIG. 48 to its wall-engaging extended position shown in FIG. 49. Housing notch 585 is suitably contoured to accommodate this quarter turn bodily movement of cam pin 568. As slide block 580' is thus moved from the retracted position of FIG. 48 to the extended position in FIG. 49, cam pin 592 fixed to block 580' travels in the other housing cam slot 590 to thereby rotate latch finger 586 from the position of FIG. 48 to the position of FIG. 49. This rotary latching motion occurs only during the last increment of outward travel of finger 586 bodily with the pallet support pin 584 fixedly carried on block 580' and vice versa during the reversal of motion on the retraction stroke.

Figure 50:
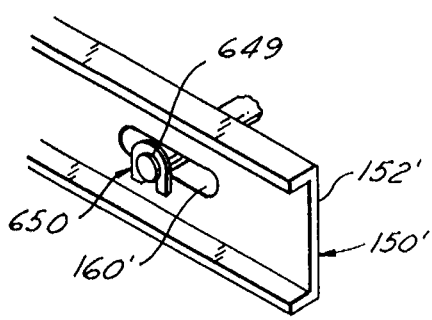
FIG. 50 is a fragmentary perspective view of still another embodiment of a pallet supporting interior side wall construction and associated pallet pin utilizing a manually inserted pin locking clip also in accordance with the present invention.

FIG. 50 illustrates a modified embodiment of wall panel 150 of FIGS. 19-21 in which a modified wall panel 150' is constructed the same as wall panel 150 except that the pallet-pin-supporting oval holes 160' are oriented with their major longitudinal axis horizontal in a horizontally extending row in each of the interior corrugation panels 152'. FIG. 50 also illustrates the use of a manual wall locking system in which a circular groove 649 is provided near the free end of each pallet supporting pin 22', and Groove 649 removably receives a manually inserted standard retaining clip 650 therein to prevent inadvertent or undesired retracting of pin 22' from its supporting engagement with wall panel 150' in its pin slot 160'. It will also be understood that a conventional gang latch bar locking system may be substituted for clips 650, e.g., a longitudinally movable notched locking bar slidably supported and running along each horizontal row of openings 160' for engaging and disengaging the groove 649 of any pin 22' protruding through any openings 160' in the row associated with each such latch bar.

Figure 51:
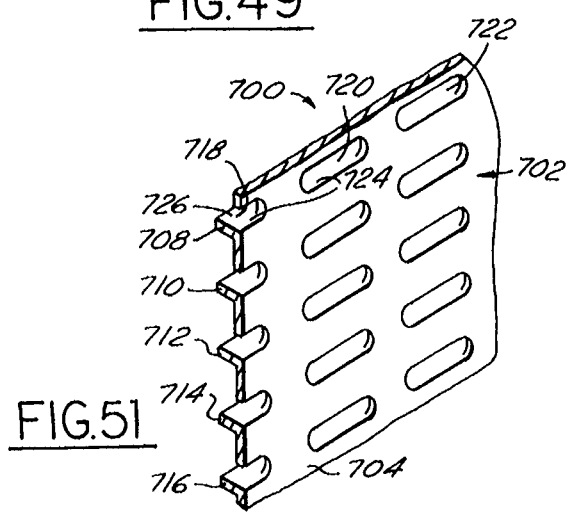
FIG. 51 is a fragmentary perspective view of still another form of pallet-supporting interior side wall construction also in accordance with the present invention.

FIG. 51 illustrates still another embodiment of a pallet supporting interior wall construction in accordance with the present invention in which a modified wall panel 700 may be made in suitably sized sections for erection to form the laterally spaced interior upright side walls of trailer 1, similar to wall sections 23 or 150, for example. Wall panel 700 comprises a flat sheet portion 702 which may be of generally uniform thickness between its trailer-interior-facing surface 704 and its opposite surface 706. Panel 702 is characterized by horizontally extending and vertically spaced ribs 708, 710, 712, 714, 716 which protrude trailer-exteriorly perpendicular to surfaces 704,706 of panel section 702, and which are integrally joined to flat portions 702 by conjoint extrusion therewith. Panel 702 has a uniform predetermined pattern of pallet-pin-supporting openings 718, 720, 722 of oval shape with their major longitudinal axes extending horizontally and oriented to form vertical and horizontal rows in wall panel 70. The lower edge 724 of each panel opening 718, 720, etc. is made flush with the upwardly facing horizontal surface 726 of each associated rib 708–716. Thus the four support pins 22 of each pallet 11 when registered with and protruding through selected wall openings 718, 720, etc. will rest, under the weight of the pallet loading imposed thereon, on upper surface 726 of the associated rib 708–716. Hence the deformation-inducing weight load imposed by the pin on panel 700 is spread into the rib as well as being carried by the edge 724 of the registered opening. This enables wall panel 700 to be extruded to a thinner thickness dimension between surfaces 704 and 706 to thereby enhance the strength-to-weight ratio of the wall panel. Ribs 708–716 also provide a stiffening reinforcement for the panel longitudinally of trailer 1 to thereby enhance the ability of the wall to resist shock loading fore and aft of the trailer.

If desired, ribs 708 and 716 may be extruded so as to be angled slightly upwardly as they protrude exteriorly from the flat panel portion 702. Hence, a given pallet supporting pin resting on the inclined rib will tend to non-permanently deflect the same, due to the slight resilience of the cantilevered rib, down to a horizontal position to thereby ensure that weight loading is spread into the rib by the pin resting thereon, and also to provide a slight springiness to support of the pallet on the wall. Panels 700 may be readily economically manufactured in high volume in one continuous operation by a conventional cold or hot extrusion processes, and the pallet pin openings 718–722 sequentially gang punched downstream of the extrusion machine, followed by a suitable shearing operation to cut the sections to desired longitudinal lengths. For at least these reasons, the side wall panel construction 700 of FIG. 51 is presently preferred, particularly in higher unit volume applications of the invention. It will also be understood, as indicated previously in regard to FIG. 30, that panel 700 may also be provided with a predetermined pattern array of circular wall holes 21 interposed in the pattern of horizontal slots 720, 722 for selective engagement by one laterally aligned pair of pallet pins should further restraint against fore and aft pallet movement be desired.

It is to be further understood that, although the foregoing description and drawings describe and illustrate in detail various preferred embodiments of the invention, to those skilled in the art to which the present invention relates the present disclosure will suggest many modifications and constructions as well as widely differing embodiments and applications without thereby departing from the spirit and scope of the invention. The present invention, therefore, is intended to be limited only by the scope of the appended claims and the applicable prior art.

We claim:

1. Apparatus for storing and transporting vehicles and general cargo comprising:

an elongate hollow transport container having a pair of longitudinally extending laterally spaced apart upright pallet-supporting side walls extending longitudinally of said container and defining parallel boundary planes forming an interior cargo-carrying space of said container having a longitudinal axis extending lengthwise of said container between rearward and forward ends thereof, a rearward openable end through which palletized vehicles may be conveyed, and longitudinally extending internal cargo conveyance means including a pair of rails supported one along each said side walls, said cargo conveyance means including a rear portion longitudinally extendable rearward of said rearward end of the cargo space over a pallet loading and unloading position exteriorly of the cargo space of said container;

a plurality of vehicle supporting pallet means upon which the vehicles are individually loadable and securable at the exterior loading-unloading position, each said pallet being generally rectangular in plan view and dimensioned widthwise to span the cargo space with a travel clearance along its longitudinal side edges;

cargo conveyance means including hoist means running on said rails longitudinally within said cargo space and being capable of conveying each of said pallet means endwise individually longitudinally and vertically between the loading position and a selected forward storage position in the cargo space, and of pivoting each said pallet means about a non-vertical axis from a loading orientation to a storage orientation within the cargo space, and a plurality of on-board pallet support means provided on each of said pallet means and positioned thereon at a given distance apart along the longitudinal edges thereof and operable for releasably coupling each associated pallet means to said side walls of said container in the selected storage orientation of such pallet means, said side walls each having an array of individual pallet support means provided thereon facing the cargo space and in substantially greater quantity than the total number of said pallet on-board support means and being arranged in a predetermined fixed pattern along known Cartesian coordinates in the cargo space boundary plane of each said side wall and pattern related to the given spacing between said on-board pallet support means whereby each said pallet means is supportable with a vehicle loaded thereon by releasable interengagement of its on-board pallet support means with associated selected spaced apart ones of said side wall pallet support means such that each said pallet means is thereby held in the cargo space by and laterally between said side walls in a predetermined storage orientation and at the selected predetermined storage position at identifiable appropriate Cartesian coordinates in said pattern of said side wall pallet support means selected for cooperable engagement with said pallet on-board support means to provide for such storage orientation and positioning of each said pallet means.

2. The apparatus set forth in claim 1 wherein said conveyance means comprises an overhead crane running upon said longitudinal rails, said rails being constructed and arranged one along the upper edge of each of said side walls to provide an upper crane runway for movement of said hoist means longitudinally within the cargo space of said container.

3. The apparatus set forth in claim 2 wherein the said extendable rear portion comprises movable crane runway extension rails longitudinally extendable rearward of the openable rear end of said container to form an exterior continuation of said rails in the cargo space.

4. The apparatus set forth in claim 3 wherein said container comprises a truck semi-trailer road vehicle.

5. The apparatus set forth in claim 3 wherein said container comprises a rail car.

6. The apparatus set forth in claim 3 wherein said container comprises an intermodal cargo container.

7. The apparatus set forth in claim 1 wherein said pattern of said side wall individual pallet support means comprises first and second rows of spaced apart individual pallet support means exposed on the associated one of said side walls to the cargo space, said rows extending transversely relative to one another in the cargo space boundary plane of each associated side wall.

8. The apparatus set forth in claim 7 wherein the spacing of individual pallet support means from one another on said side walls in said first and second rows is at equal increments longitudinally of each such row and is the same for all said first rows and the same for all of said second rows.

9. The apparatus set forth in claim 8 wherein said first and second rows respectively extend generally perpendicular and parallel to the longitudinal axis of the container cargo space.

10. The apparatus set forth in claim 8 wherein said spacing is the same in both said first and second rows.

11. The apparatus set forth in claim 1 wherein said on-board pallet support means provided on each of said pallet means comprises movable couplers, and said plurality of side wall pallet support means comprises a series of static couplers cooperable for releasable support engagement with said on-board pallet movable couplers and being disposed in said predetermined fixed pattern over generally the entire area of said side walls exposed to the cargo-carrying space of said container, said couplers comprising cooperatively interengageable male and female couplers.

12. The apparatus set forth in claim 11 wherein said interior side walls of said container each comprise a panel-like structure and said static couplers are formed as said female couplers and comprise sockets or holes in said panel-like side wall structure.

13. The apparatus set forth in claim 11 wherein all of said pallets have the same predetermined length and width dimensions defining respectively a major plane of each said pallet.

14. The apparatus set forth in claim 13 wherein said pallets are constructed and arranged so as to be generally thin and flat and stackable on one another when empty.

15. The apparatus set forth in claim 14 wherein said pallet onboard support means are provided in sets of four each with one set on each of said pallets and are constructed and arranged on each said pallet generally one at each of the four corners of each said pallet so as to extend therefrom in the major plane of said pallet in a direction perpendicular to the plane of said side walls with the pallet major plane likewise oriented perpendicular to said side wall planes, said sets having the same orientation pallet-to-pallet.

16. The apparatus set forth in claim 11 wherein said static couplers are formed as said female couplers and said movable couplers are formed as said male couplers, and each of said male couplers includes a movable male member cooperative selectively with each of said female couplers for engaging the same in pallet-supporting relationship, said male members being operable to move laterally outwardly from the opposite longitudinally sides of each associated and pallet to a wall-engaged pallet supporting position in engagement with a spaced-apart selected female couplers, and being retractable therefrom to a position providing said side clearance between each associated pallet and said laterally spaced side walls when each said pallet is oriented with its major plane perpendicular to the cargo space boundary planes of said side walls.

17. The apparatus set forth in claim 16 wherein said female couplers provided on said interior side walls are static structures with no moving parts.

18. The apparatus set forth in claim 11 wherein the cargo carrying space of said container is enclosed at the top, sides and bottom, as well as fore and aft, by cargo protective weather sealing structures such as wall panels, doors, and tarps.

19. The apparatus set forth in claim 18 wherein said container comprises a road vehicle truck semi-trailer provided with road wheels adjacent but spaced forward from the rearward openable end of said semi-trailer, said wheels being separated from the interior cargo carrying space by an associated wheel well structure protruding upwardly into the cargo carrying space of said semi-trailer, said semi-trailer having a cargo-carrying floor arranged at an elevation below the uppermost elevation of said wheel well structure and extending both forwardly and rearwardly from said wheel well structure in the cargo space.

20. The apparatus set forth in claim 19 wherein said semi-trailer is provided with a pallet stacking storage area between said wheel well structure and the rearward operable end of said semi-trailer that is convertible between a cargo storage area when said pallets are in use and a pallet stacking storage area when said pallets are not in use.

21. The apparatus set forth in claim 1 wherein each said pallet includes vehicle supporting structure for individually supporting each of the wheels of a vehicle and associated vehicle tie-down means.

22. The apparatus set forth in claim 17 wherein said side walls each comprise a uniformly corrugated panel configuration with the corrugations defining, in cross section transverse to the cargo space longitudinal axis, alternating front and rear upright panels relative to facing the cargo space of said container, and wherein the longitudinal axis of said corrugations are oriented in one of the following orientations relative to the longitudinal axis of the cargo space of said container:

(a) perpendicular to such longitudinal axis, (b) parallel to such longitudinal axis, (c) diagonally relative to said such longitudinal axis.

23. The apparatus set forth in claim 17 wherein said female couplers of each of said side walls of said container have a configuration and orientation in a major plane of the side wall selected from the group consisting of:

(a) a circular opening, (b) an oval opening oriented with its major axis parallel to the longitudinal axis of the container cargo space, (c) an oval opening oriented with its major axis perpendicular to the longitudinal axis of the container cargo space, (d) an oval opening with the openings arranged in first and second rows extending with their respective major axes transversely relative to one another and with the major axes of the ovals oriented perpendicular to one another alternately in each of said rows, or (e) a diamond shaped opening with said openings being formed in a latticework "X" array of channels constituting each said side wall.

24. The apparatus set forth in claim 1 wherein said hoist means of said cargo conveyance means comprises a pair of hydraulically operated telescopic rams spaced apart laterally of the cargo space one adjacent each of said side walls, each of said rams having pallet-lifting attachment means carried thereon on the extendable free ends thereof, and wherein each of said pallets includes on-board hoist coupler means disposed one on each of the laterally spaced longitudinal sides thereof cooperable with the associated hoist pallet lifting attachment means on each of said rams for releasable engagement therewith, said ram hoisting attachment means being operable for pivoting an associated one of said pallets engaged therewith about an axis perpendicular to a major boundary plane of each of said side walls.

25. The apparatus set forth in claim 24 wherein each said pallet includes an on-board power train mechanism operably coupled between each of said on board pallet support means on said pallet and a releasable connection means cooperable with said ram hoist attachment means for controllably operating said on board pallet support means between pallet-retracted positions and extended wall engaging positions.

26. The apparatus set forth in claim 24 wherein each said ram hoist attachment means includes quarter-turn fastener elements cooperable with said on-board pallet coupling means for releasable engagement between said hoist ram and the associated said pallet.

27. The apparatus set forth in claim 11 wherein each of said pallets includes an on-board self-contained power operating system operable for retracting and extending each of said on-board pallet movable coupling means of said pallet, said on-board system including a fluid-operated ram and associated working fluid storage means for said ram and power train means operably interconnecting said ram with said movable coupling means for retracting and extending the same in response to operation of said ram by said working fluid.

28. The apparatus set forth in claim 27 wherein said power train means comprises biasing means associated with each of said movable couplers for yieldably biasing the same to extended wall engaging position and a flexible element means retracting system operably connected between said ram and said movable couplers for retracting said couplers against the biasing force of said biasing means.

29. The apparatus set forth in claim 11 wherein each said pallet includes on-board movable coupler power train operating means comprising a flexible element power transmitting loop having a run portion thereof connected in driving relationship to each associated movable coupler means for moving the same between extended and retracted positions in response to driving movement of said loop in opposite directions, and driving means operably connected to said flexible element for reversely driving said loop.

30. The apparatus set forth in claim 29 wherein said loop driving means comprises a servo motor drive unit, and said hoist includes electrical coupling means operable upon attachment to said pallet for energizing and controlling said servo motor means.

31. The apparatus set forth in claim 25 wherein said on-board power train operating means comprises a mechanical drive train system including cooperable gear means and rotary input means operably connected therewith for rotatably driving said gear means to extend and retract said on board pallet support means.

32. The apparatus set forth in claim 25 wherein said on-board power train operating system includes a cam operating mechanism associated with each of said on board pallet support means and operably coupled to said power train for extending and retracting said on board pallet support means.

33. The apparatus set forth in claim 17 wherein each of said female couplers comprises a through-opening in the associated said side walls, and wherein each of said male couplers of each said pallets includes a pallet support pin having a free end shaped for endwise engagement with a selected one of said female couplers, and each said male coupler further includes latch means movably mounted on the wall-engaging free end thereof movable relative thereto between a wall-entry position and a wall-latching position.

34. The apparatus set forth in claim 33 wherein said latch means each comprises a locking finger rigidly fixed on and protruding laterally from a free end of each associated pallet support pin, and wherein said female couplers each comprise an oval shaped through-opening in said side wall, and each said pallet includes pin driving means for rotating said pin and finger bodily as a unit about a longitudinal axis of the associated pallet support pin for aligning said finger with its major axis parallel to a major axis of the associated oval wall opening for passage therethrough, and for rotating said finger to an orientation transverse to the major axis of said oval opening for blocking retraction movement from such opening with the finger disposed on the side of said side wall disposed remote from the cargo space of said container.

35. The apparatus set forth in claim 33 wherein said pin latching means each comprises a finger pivotably mounted on said free end of each associated pallet support pin and pivotable between a wall-opening entry position and a wall-opening interference latching position relative to each associated selectively engaged female coupler opening of said side wall, and means operably coupled between said pivot finger and said pallet including a lost-motion coupling mechanism operable to pivot said finger from entry to latching position during a last increment of travel of said pin free end through such associated opening in said side wall, and vice versa.

36. The apparatus set forth in claim 11 wherein each said side wall of said container has a corrugated configuration, in cross-section transverse to the cargo space longitudinal axis, oriented in a vertically alternating pattern of longitudinally extending shelf corrugations interconnected by associated rear panels, and wherein each of said movable couplers of each of said pallets has a bifurcated free end formation operable upon extension of movable coupler from said pallet to slidably embrace and engage a selected shelf corrugation at a selected location on said wall corrugation.

37. The apparatus set forth in claim 36 wherein the vertical spacing between mutually adjacent shelf corrugations of said wall corrugation is dimensioned to slidably receive therebetween the entire bifurcated portion of said coupling pin head.

38. The apparatus set forth in claim 37 including abutment means located along said shelf corrugations at predetermined spaced increments longitudinally therealong and being constructed and arranged to receive between mutually adjacent ones of said abutment means said bifurcated head of said coupling pin for limiting movement thereof longitudinally along said shelf.

39. The apparatus set forth in claim 11 wherein each of said side walls comprises a corrugated panel having a corrugation configuration, in cross-section transverse to the cargo space longitudinal axis, comprising a repeat pattern of a front wall panel portion closest to the interior cargo space, a rear panel spaced away from said front panel outwardly from the cargo space, a horizontal shelf panel connected to a lower edge of said rear panel and to an upper edge of said front panel via a return bend portion joining said front panel with said shelf panel and thereby defining a rib extending longitudinally of the corrugation, said front wall panels having openings formed therein in a uniformly spaced row longitudinally thereof defining said static couplers on said side wall and adapted for selective reception of a coupling pin of each of said movable coupling means.

40. The apparatus set forth in claim 39 wherein said corrugated wall panel includes a slider block received between mutually adjacent shelf panels and entrapped in the guideway space defined therebetween and by the mutually adjacent connecting ribs of said corrugations, said slider block being movable longitudinally of said corrugations within its associated guideway and having a opening formed therein adapted to receive a coupling pin of said pallet.

41. The apparatus set forth in claim 11 wherein each of said side walls comprises a latticework-type construction made up of first and second channel members respectively arranged in first and second rows of spaced apart parallel channels with the channels of the first row being fixedly interconnected to the channels of the second rows, said first set of channels being disposed on the cargo interior side of said side wall and the second set of panels being disposed on the exterior side thereof, and wherein the mutual lateral spacing of skid channel sets respectively at each intersection thereof forms an opening through said latticework wall construction adapted to receive selectively therein a pallet coupling pin.

42. The apparatus set forth in claim 41 wherein said first and second channel members each have a flange extending along each of the opposite transversely spaced edges thereof and extending perpendicularly to the cargo space boundary plane of said latticework side wall, said flanges in assembly of said channels in said latticework array forming boundary walls around each of said openings to further assist and support in cradling of a pallet pin received in pallet supporting relationship in the selected latticework opening surrounded by said flanges.

43. The apparatus set forth in claim 42 wherein said first and second channel members each have a generally C-shaped cross-sectional configuration and are overlayed and affixed together in back-to-back relationship.

44. The apparatus set forth in claim 11 wherein each of said side walls comprises a generally flat metal sheet or plate portion disposed with its length and width dimensions in the cargo space boundary plane of said side wall, said side wall panel static couplers comprising a uniform pattern of circular openings formed in said flat portion, said movable couplers each comprising a cylindrical pin having a free end insertable in wall supporting engagement in each selected associated one of said wall openings, each of said openings being defined by a margin portion of said panel having an annular configuration surrounding and defining the associated panel opening and generally defining a concavity facing the interior cargo space of said container for cam guiding said pin free end into the associated wall hole.

45. The apparatus set forth in claim 44 wherein said free ends of said pallet pins have a convexly pointed shape cooperable with said concave camming surface of each said wall opening to assist in guiding and registry of a pin through a selected wall opening.

46. The apparatus set forth in claim 23 wherein said container has an exterior shroud wall construction disposed one on the exterior-remote side of each said side wall panel construction and spaced exteriorly of said container therefrom, and further includes a grid array of illuminating devices mounted on the interior surface of said exterior shroud facing the associated one of said side walls and individually oriented for illuminating each associated opening in said side wall to thereby selectively visably identify within the cargo space pallet pin receiving positions on said side wall for a given pallet storage location.

47. The apparatus set forth in claim 46 wherein said interior surface of each said exterior shroud wall further includes detecting means associated with each of said illuminating means and operable to detect and signal the presence or absence of a pallet pin registered in the associated wall opening.

48. The apparatus set forth in claim 11 wherein each said side wall is constructed and arranged from one or more panel members, each said panel member comprising an extrusion having a configuration, in cross-section transverse to the cargo space longitudinal axis, made up of a flat panel-like major portion oriented with its length and width dimensions extending in the cargo space boundary plane, said panel major portion having rows of pallet-pin-receiving openings arranged in a uniform pattern and each said opening having an oval configuration with its major axis extending generally parallel to the longitudinal axis of the cargo space, said panel member further having a row of integral flanges protruding from the exterior surface thereof away from the cargo receiving space, each flange extending adjacent and along the lower edge of each associated longitudinal row of said openings to provide shelf-type support for a pallet pin registered through an associated opening in said exterior wall panel.

49. The apparatus set forth in claim 48 wherein said flanges are angled upwardly slightly from perpendicular to the side wall boundary plane in a direction exteriorly of the cargo space and constructed to have a slight resilience under the load bearing weight of a pallet pin resting thereon.

50. A method of storing palletized cargo nested within a hollow container transport having longitudinally extending and laterally spaced upright side walls defining laterally between the mutually facing surfaces thereof a cargo-receiving interior space of the container, a rearward openable end through which palletized cargo may be conveyed to and from the cargo space, and a self-contained pallet conveying hoist running in the cargo space on longitudinally extending internal rail means supported along the side walls, the method comprising:

(a) prior to storing of the cargo in the container transport providing on each of said side walls an array of pallet support coupling means in a predetermined pattern covering generally the entire area of the cargo-space facing surface of each of said side walls, said mutually facing side wall coupling means being cooperable for releasably coupling with a cargo-loaded pallet to support the same on and between said side walls in a multiplicity of predetermined locations corresponding to a selected storage position of respectively associated cargo-loaded pallets, (b) providing a plurality of cargo supporting pallets upon which cargo is individually loaded at a loading station exteriorly of the cargo space, and each having wall coupling means provided thereon at given uniform locations related to a selected plurality of said side wall pallet support coupling means for defining therewith two or more wall-coupled storage positions of differing angular orientation for each said pallet, (c) providing pallet connector means on the hoist operable for releasable coupling to each pallet for lifting and carrying of the same, (d) individually loading on and securing to the pallets an associated cargo load at the loading station, (e) individually releasably coupling the hoist pallet connector means to a pallet so loaded with cargo, (f) individually sequentially conveying cargo loaded pallets from the loading station longitudinally and vertically within the container cargo space to a selected forward storage position, the cargo loaded pallet being supported on the hoist running on the rail means;

(g) pivoting the cargo loaded pallet as needed about a nonvertical axis while suspended from the hoist from a loading orientation to a storage orientation;

(h) releasably coupling the cargo loaded pallet to the mutually facing side wall support means in the storage orientation at the selected storage position;

(i) decoupling the hoist from the stored cargo loaded pallet and returning the hoist to the loading station, and (j) repeating the above steps for successive cargo loaded pallets to nest a plurality of cargo loaded pallets in a selected series of progressively rearward longitudinal storage positions in associated storage orientations thereby enabling substantial filling of the interior of the container with a space optimized total load of cargo loaded pallets.

51. The method according to claim 50 wherein the selection of cargo loaded pallet storage positions and orientations is automatically computer program optimized prior to the loading operation for a given container total cargo load, and wherein the operation of the hoist is preprogrammed on the computer program to be automatically controlled to operate to sequentially perform at least steps (f) through (h).

52. The method according to claim 50 wherein step (a) is performed by first laying out the X and Y Cartesian coordinates on the facing surface of each side wall in uniform increments along each coordinate to provide a graphic grid layout of the side wall cargo facing surface dimensionally scaled to correspond with the height and width dimensions of such side wall cargo facing surface generally coextensive with the cargo space, then selecting a cargo total load for the container to be palletized for loading therein as discrete subloads on each pallet, then laying out to scale the side silhouette of each pallet and associated subload thereon, providing said pallet connector means on each pallet along the opposite longitudinal edges thereof at given locations spaced longitudinally of each said pallet a given distance apart to predetermine the wall engaging points for each said pallet on the layout silhouettes, then arranging all of the pallet subloaded scaled silhouettes on said grid pattern in a manner such as to optimize the cargo carrying capacity of the cargo space of the container in side view to thereby provide an optimum array of storage positions for the cargo loaded pallets for said given total load, during said optimization layout step locating on sid grid pattern spaced pallet support coupling means on the facing surface of the side wall providing the closest approximation to optimized storage locations and identifying such selected wall engaging positions, then performing steps (f) through (h) by following said preprogrammed scaled storage layout as thus identified in the preprogramming of the cargo load.

53. The method as set forth in claim 52 wherein step (h) is performed by providing movable coupling mechanisms on each pallet at said given positions thereon operable to extend and retract in the major plane of the pallet into and out of engagement with the selected pallet support coupling means on each of the mutually facing side walls at the selected storage positions for such pallet, and operating said coupling members from retracted to extended positions when so located to thereby releasably couple the associated cargo loaded pallet to the mutually facing side wall support means in the storage orientation at the selected storage position.

* * * * *